US012579957B2

(12) United States Patent
Park et al.

(10) Patent No.: US 12,579,957 B2
(45) Date of Patent: Mar. 17, 2026

(54) GAMMA CORRECTION METHOD FOR A DISPLAY DEVICE

(71) Applicant: Samsung Display Co., LTD., Yongin-si (KR)

(72) Inventors: Geonhwi Park, Anyang-si (KR); Hyunjoo Seo, Changwon-si (KR); Kihyun Pyun, Gwangmyeong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 177 days.

(21) Appl. No.: 18/096,536

(22) Filed: Jan. 12, 2023

(65) Prior Publication Data

US 2023/0326426 A1 Oct. 12, 2023

(30) Foreign Application Priority Data

Apr. 8, 2022 (KR) ........................ 10-2022-0043970

(51) Int. Cl.
*G09G 3/3283* (2016.01)
*G09G 5/06* (2006.01)

(52) U.S. Cl.
CPC ....... *G09G 5/06* (2013.01); *G09G 2320/0233* (2013.01); *G09G 2320/0276* (2013.01); *G09G 2320/0666* (2013.01); *G09G 2320/0673* (2013.01); *G09G 2360/16* (2013.01)

(58) Field of Classification Search
CPC .. G09G 3/3283; G09G 3/3275; G09G 3/2003; G09G 2360/16; G09G 2320/0673; G09G 2320/0666; G09G 2320/0276; G09G 2320/04; G09G 2320/0285; G09G 2320/0271; G09G 2320/0242; G09G 2320/0233
See application file for complete search history.

(56) References Cited

U.S. PATENT DOCUMENTS

2021/0166606 A1* 6/2021 Han ........................ G09G 3/006
2024/0054950 A1* 2/2024 Hou ...................... G09G 3/3208

FOREIGN PATENT DOCUMENTS

KR 1020070087288 8/2007
KR 1020180058245 6/2018
KR 101943419 1/2019
KR 1020190116599 10/2019
KR 102061554 1/2020
KR 1020200046753 5/2020

* cited by examiner

*Primary Examiner* — Dennis P Joseph
(74) *Attorney, Agent, or Firm* — CANTOR COLBURN LLP

(57) ABSTRACT

A gamma correction method for a display device determines a first voltage code for a first color corresponding to each of grayscale values based on a target gamma value and a target color coordinate at a reference measurement point, generates a first lookup table including the first voltage code for the first color, determines a second voltage code for the first color corresponding to each of the grayscale values based on the target gamma value and the target color coordinate at a correction measurement point, generates a first color position correction value based on the first voltage code for the first color and the second voltage code for the first color, and performs gamma correction using the first color position correction value and the first lookup table.

10 Claims, 19 Drawing Sheets

FIG. 12

| GRAYSCALE | RMP | | | CMP | | |
|---|---|---|---|---|---|---|
| | CODE1_R | CODE1_G | CODE1_B | CODE2_R | CODE2_G | CODE2_B |
| 0 | 976 | 937 | 891 | 1025 | 959 | 936 |
| 4 | 1052 | 1009 | 975 | 1101 | 1027 | 1020 |
| 8 | 1126 | 1075 | 1044 | 1174 | 1090 | 1089 |
| 12 | 1191 | 1132 | 1102 | 1237 | 1147 | 1146 |
| 16 | 1252 | 1186 | 1156 | 1297 | 1201 | 1200 |
| 20 | 1311 | 1238 | 1209 | 1355 | 1252 | 1251 |
| 24 | 1369 | 1289 | 1261 | 1413 | 1302 | 1302 |
| 28 | 1429 | 1339 | 1312 | 1471 | 1353 | 1353 |
| 32 | 1488 | 1390 | 1363 | 1529 | 1403 | 1404 |
| 36 | 1548 | 1441 | 1415 | 1588 | 1454 | 1455 |
| 40 | 1608 | 1492 | 1467 | 1646 | 1505 | 1506 |
| 44 | 1667 | 1543 | 1519 | 1705 | 1557 | 1558 |
| 48 | 1727 | 1595 | 1572 | 1764 | 1608 | 1610 |
| 52 | 1788 | 1647 | 1625 | 1823 | 1660 | 1662 |
| 56 | 1850 | 1699 | 1678 | 1883 | 1711 | 1714 |
| 60 | 1912 | 1751 | 1731 | 1944 | 1764 | 1766 |
| 64 | 1975 | 1805 | 1785 | 2005 | 1817 | 1820 |

FIG. 13

| GRAYSCALE | CMP | | |
|---|---|---|---|
| | LCV_R | LCV_G | LCV_B |
| 0 | 1.05 | 1.02 | 1.05 |
| 4 | 1.05 | 1.02 | 1.05 |
| 8 | 1.04 | 1.01 | 1.04 |
| 12 | 1.04 | 1.01 | 1.04 |
| 16 | 1.04 | 1.01 | 1.04 |
| 20 | 1.03 | 1.01 | 1.03 |
| 24 | 1.03 | 1.01 | 1.03 |
| 28 | 1.03 | 1.01 | 1.03 |
| 32 | 1.03 | 1.01 | 1.03 |
| 36 | 1.03 | 1.01 | 1.03 |
| 40 | 1.02 | 1.01 | 1.03 |
| 44 | 1.02 | 1.01 | 1.03 |
| 48 | 1.02 | 1.01 | 1.02 |
| 52 | 1.02 | 1.01 | 1.02 |
| 56 | 1.02 | 1.01 | 1.02 |
| 60 | 1.02 | 1.01 | 1.02 |
| 64 | 1.02 | 1.01 | 1.02 |

FIG. 15

| GRAYSCALE | R_R | R_G | R_B | GCV_R | GCV_G | GCV_B |
|---|---|---|---|---|---|---|
| 0 | 0.35 | 0.25 | 0.40 | 1.60 | 0.36 | 5.00 |
| 4 | 0.24 | 0.65 | 0.11 | 1.09 | 0.93 | 1.38 |
| 8 | 0.21 | 0.69 | 0.09 | 0.95 | 0.99 | 1.13 |
| 12 | 0.21 | 0.70 | 0.09 | 0.95 | 1.00 | 1.13 |
| 16 | 0.21 | 0.70 | 0.09 | 0.95 | 1.01 | 1.13 |
| 32 | 0.21 | 0.70 | 0.09 | 0.95 | 1.01 | 1.13 |
| 48 | 0.21 | 0.70 | 0.09 | 0.95 | 1.00 | 1.13 |
| CG~ 64 | 0.21 | 0.70 | 0.09 | 0.95 | 1.00 | 1.13 |
| 80 | 0.21 | 0.70 | 0.09 | 0.95 | 1.00 | 1.13 |
| 96 | 0.21 | 0.70 | 0.09 | 0.95 | 1.00 | 1.13 |
| 112 | 0.21 | 0.70 | 0.09 | 0.95 | 1.00 | 1.13 |
| 128 | 0.21 | 0.70 | 0.09 | 0.95 | 1.00 | 1.13 |
| 144 | 0.21 | 0.70 | 0.09 | 0.95 | 1.00 | 1.13 |
| 160 | 0.22 | 0.70 | 0.09 | 1.00 | 1.00 | 1.13 |
| 176 | 0.22 | 0.70 | 0.08 | 1.00 | 1.00 | 1.00 |
| 192 | 0.22 | 0.70 | 0.08 | 1.00 | 1.00 | 1.00 |
| 208 | 0.22 | 0.70 | 0.08 | 1.00 | 1.00 | 1.00 |
| 224 | 0.22 | 0.70 | 0.08 | 1.00 | 1.00 | 1.00 |
| 240 | 0.22 | 0.70 | 0.08 | 1.00 | 1.00 | 1.00 |
| RG~ 255 | 0.22 | 0.70 | 0.08 | 1.00 | 1.00 | 1.00 |

FIG. 17

| GRAYSCALE | RT | | | CT | | |
|---|---|---|---|---|---|---|
| | L_R | L_G | L_B | L_R | L_G | L_B |
| 0 | 0.0007 | 0.0005 | 0.0008 | 0.0006 | 0.0004 | 0.0004 |
| 4 | 0.0366 | 0.0974 | 0.0164 | 0.0292 | 0.0752 | 0.0127 |
| 8 | 0.1851 | 0.5994 | 0.0801 | 0.1564 | 0.5185 | 0.0714 |
| 12 | 0.4463 | 1.4744 | 0.1882 | 0.393 | 1.3211 | 0.1728 |
| 16 | 0.8378 | 2.8076 | 0.3431 | 0.744 | 2.4932 | 0.3175 |
| 32 | 3.7968 | 12.7064 | 1.5369 | 3.409 | 11.5196 | 1.4379 |
| 48 | 9.208 | 30.3749 | 3.7414 | 8.2965 | 27.605 | 3.4813 |
| 64 | 17.3547 | 57.2407 | 7.0169 | 15.6532 | 51.7099 | 6.5334 |
| 80 | 27.9927 | 91.975 | 11.2948 | 25.4697 | 840.126 | 10.6253 |
| 96 | 41.5296 | 135.868 | 16.6709 | 37.9522 | 125.1081 | 15.7135 |
| 112 | 57.9614 | 188.9253 | 23.2519 | 53.2651 | 174.9963 | 21.9908 |
| 128 | 77.721 | 253.1712 | 31.0896 | 71.6651 | 235.3645 | 29.5198 |
| 144 | 100.0564 | 325.7137 | 40.0221 | 92.7246 | 303.6645 | 38.0687 |
| 160 | 125.8863 | 408.9337 | 48.9831 | 116.8165 | 381.9028 | 47.6456 |
| 176 | 154.7162 | 500.9243 | 60.9049 | 143.9413 | 469.4457 | 58.3039 |
| 192 | 187.4655 | 605.801 | 73.5259 | 174.7243 | 568.5982 | 70.4523 |
| 208 | 222.808 | 721.0162 | 87.2606 | 208.2999 | 677.4708 | 83.7434 |
| 224 | 261.9563 | 845.7034 | 102.2257 | 245.3001 | 796.0073 | 98.2776 |
| 240 | 304.207 | 984.0669 | 118.6818 | 285.1435 | 926.9986 | 114.1952 |
| 255 | 347.3628 | 1120.078 | 135.0826 | 325.5382 | 1055.689 | 129.9744 |

FIG. 18

| GRAYSCALE | TCV_R | TCV_G | TCV_B |
|---|---|---|---|
| 0 | 1.17 | 1.25 | 2.00 |
| 4 | 1.25 | 1.30 | 1.29 |
| 8 | 1.18 | 1.16 | 1.12 |
| 12 | 1.14 | 1.12 | 1.09 |
| 16 | 1.13 | 1.13 | 1.08 |
| 32 | 1.11 | 1.10 | 1.07 |
| 48 | 1.11 | 1.10 | 1.07 |
| 64 | 1.11 | 1.11 | 1.07 |
| 80 | 1.10 | 1.09 | 1.06 |
| 96 | 1.09 | 1.09 | 1.06 |
| 112 | 1.09 | 1.08 | 1.06 |
| 128 | 1.08 | 1.08 | 1.05 |
| 144 | 1.08 | 1.07 | 1.05 |
| 160 | 1.08 | 1.07 | 1.05 |
| 176 | 1.07 | 1.07 | 1.04 |
| 192 | 1.07 | 1.07 | 1.04 |
| 208 | 1.07 | 1.06 | 1.04 |
| 224 | 1.07 | 1.06 | 1.04 |
| 240 | 1.07 | 1.06 | 1.04 |
| 255 | 1.07 | 1.06 | 1.04 |

GAMMA CORRECTION METHOD FOR A DISPLAY DEVICE

This application claims priority to Korean Patent Application No. 10-2022-0043970, filed on Apr. 8, 2022, and all the benefits accruing therefrom under 35 U.S.C. § 119, the content of which in its entirety is herein incorporated by reference.

BACKGROUND

1. Field

Embodiments of the present invention relate to a display device. More particularly, embodiments of the present invention relate to a display device performing a color correction and a gamma correction method for the display device.

2. Description of the Related Art

Generally, a display device may include a display panel, a timing controller, gate driver, and a source driver. The display panel may include a plurality of gate lines, a plurality of data lines, and a plurality of pixels electrically connected to the gate lines and the data lines. The gate driver may provide gate signals to the gate lines. The source driver may provide data voltages to the data lines. The timing controller may control the gate driver and the source driver.

The display device may perform luminance and color correction (hereinafter, referred to as "gamma correction"). When gamma correction is performed, luminous efficiency of the display panel may be different according to a grayscale value, a temperature, etc., and thus a color coordinate shift may occur. When the color coordinate shift occurs, the color coordinate are different according to a grayscale value, and thus a display quality of the display panel may be deteriorated.

SUMMARY

Embodiments of the present invention provide a gamma correction method for a display device that prevents a color coordinate shift according to a grayscale value, a temperature, or a position in a gamma correction.

According to embodiments of the present invention, a gamma correction method for a display device includes: determining a first voltage code for a first color corresponding to each of grayscale values based on a target gamma value and a target color coordinate at a reference measurement point, generating a first lookup table including the first voltage code for the first color, determining a second voltage code for the first color corresponding to each of the grayscale values based on the target gamma value and the target color coordinate at a correction measurement point, generating a first color position correction value based on the first voltage code for the first color and the second voltage code for the first color, and performing gamma correction using the first color position correction value and the first lookup table.

In an embodiment, the first color position correction value may be determined by dividing the second voltage code for the first color by the first voltage code for the first color.

In an embodiment, the gamma correction method may further include calculating a ratio of first color luminance to total color luminance in a reference grayscale value using the first lookup table, calculating a ratio of the first color luminance to the total color luminance in a correction grayscale value using the first lookup table, and generating a first color grayscale correction value based on the ratio of the first color luminance in the reference grayscale value and the ratio of the first color luminance in the correction grayscale value, and the gamma correction may be performed using the first color grayscale correction value.

In an embodiment, the reference grayscale value may be a maximum grayscale value.

In an embodiment, the first color grayscale correction value may be determined by dividing the ratio of the first color luminance in the correction grayscale value by the ratio of the first color luminance in the reference grayscale value.

In an embodiment, performing the gamma correction may include generating a correction voltage code for the first color based on product of the first voltage code for the first color, the first color position correction value, and the first color grayscale correction value, generating a second lookup table including the correction voltage code for the first color, and performing the gamma correction using the second lookup table.

In an embodiment, the gamma correction method may further include measuring a first color luminance at a reference temperature using the first lookup table, measuring the first color luminance at a correction temperature using the first lookup table, and generating a first color temperature correction value based on the first color luminance at the reference temperature and the first color luminance at the correction temperature, and the gamma correction may be performed using the first color temperature correction value.

In an embodiment, the first color luminance may be measured at the reference measurement point.

In an embodiment, the first color temperature correction value may be determined by dividing the first color luminance at the reference temperature by the first color luminance at the correction temperature.

In an embodiment, performing the gamma correction may include generating a correction voltage code for the first color based on product of the first voltage code for the first color, the first color position correction value, and the first color temperature correction value, generating a second lookup table including the correction voltage code for the first color, and performing the gamma correction using the second lookup table.

In an embodiment, the gamma correction method may further include determining a first voltage code for a second color and a first voltage code for a third color corresponding to each of the grayscale values based on the target gamma value and the target color coordinate at the reference measurement point, determining a second voltage code for the second color and a second voltage code for the third color corresponding to each of the grayscale values based on the target gamma value and the target color coordinate at the correction measurement point, generating a second color position correction value based on the first voltage code for the second color and the second voltage code for the second color, and generating a third color position correction value based on the first voltage code for the third color and the second voltage code for the third color, the first lookup table may further include the first voltage code for the second color and the first voltage code for the third color, and the gamma correction may be performed further using the second color position correction value and the third color position correction value.

According to embodiments of the present invention, a gamma correction method for a display device includes:

determining a first voltage code for a first color corresponding to each of grayscale values based on a target gamma value and a target color coordinate at a reference measurement point, generating a first lookup table including the first voltage code for the first color, calculating a ratio of first color luminance to total color luminance in a reference grayscale value using the first lookup table, calculating a ratio of the first color luminance to the total color luminance in a correction grayscale value using the first lookup table, generating a first color grayscale correction value based on the ratio of the first color luminance in the reference grayscale value and the ratio of the first color luminance in the correction grayscale value, and performing gamma correction using the first color grayscale correction value, and the first lookup table.

In an embodiment, the reference grayscale value may be a maximum grayscale value.

In an embodiment, the first color grayscale correction value may be determined by dividing the ratio of the first color luminance in the correction grayscale value by the ratio of the first color luminance in the reference grayscale value.

In an embodiment, performing the gamma correction may include: generating a correction voltage code for the first color based on product of the first voltage code for the first color and the first color grayscale correction value; generating a second lookup table including the correction voltage code for the first color; and performing the gamma correction using the second lookup table.

In an embodiment, the gamma correction method may further include measuring a first color luminance at a reference temperature using the first lookup table, measuring the first color luminance at a correction temperature using the first lookup table, and generating a first color temperature correction value based on the first color luminance at the reference temperature and the first color luminance at the correction temperature, and the gamma correction may be performed using the first color temperature correction value.

In an embodiment, the first color luminance may be measured at the reference measurement point.

In an embodiment, performing the gamma correction may include generating a correction voltage code for the first color based on product of the first voltage code for the first color, the first color grayscale correction value, and the first color temperature correction value, generating a second lookup table including the correction voltage code for the first color, and performing the gamma correction using the second lookup table.

In an embodiment, the gamma correction method may further include determining a second voltage code for the first color corresponding to each of the grayscale values based on the target gamma value and the target color coordinate at a correction measurement point, and generating a first color position correction value based on the first voltage code for the first color and the second voltage code for the first color, and the gamma correction may be performed using the first color position correction value.

In an embodiment, the first color position correction value may be determined by dividing the second voltage code for the first color by the first voltage code for the first color.

In an embodiment, performing the gamma correction may include generating a correction voltage code for the first color based on product of the first voltage code for the first color, the first color position correction value, the first color grayscale correction value, and the first color temperature correction value, generating a second lookup table including the correction voltage code for the first color, and performing the gamma correction using the second lookup table.

According to embodiments of the present invention, a gamma correction method for a display device include: determining a first voltage code for a first color corresponding to each of grayscale values based on a target gamma value and a target color coordinate at a reference measurement point; generating a first lookup table including the first voltage code for the first color; measuring a first color luminance at a reference temperature using the first lookup table; measuring the first color luminance at a correction temperature using the first lookup table; generating a first color temperature correction value based on the first color luminance at the reference temperature and the first color luminance at the correction temperature; and performing gamma correction using the first color temperature correction value and the first lookup table.

In an embodiment, performing the gamma correction may include: generating a correction voltage code for the first color based on product of the first voltage code for the first color and the first color temperature correction value; generating a second lookup table including the correction voltage code for the first color; and performing the gamma correction using the second lookup table.

Therefore, the display device may effectively prevent a color coordinate shift according to a position in a display panel by determining a first voltage code for a first color corresponding to each of grayscale values based on a target gamma value and a target color coordinate at a reference measurement point, generating a first lookup table including the first voltage code for the first color, determining a second voltage code for the first color corresponding to each of the grayscale values based on the target gamma value and the target color coordinate at a correction measurement point, generating a first color position correction value based on the first voltage code for the first color and the second voltage code for the first color, and performing gamma correction using the first color position correction value and the first lookup table.

In addition, the display device may effectively prevent a color coordinate shift according to a grayscale value by determining a first voltage code for a first color corresponding to each of grayscale values based on a target gamma value and a target color coordinate at a reference measurement point, calculating a ratio of first color luminance to total color luminance in a reference grayscale value using the first lookup table, calculating a ratio of the first color luminance to the total color luminance in a correction grayscale value using the first lookup table, and generating a first color grayscale correction value based on the ratio of the first color luminance in the reference grayscale value and the ratio of the first color luminance in the correction grayscale value, and performing gamma correction using the first color grayscale correction value and the first lookup table.

Further, the display device may effectively prevent a color coordinate shift according to a temperature by determining a first voltage code for a first color corresponding to each of grayscale values based on a target gamma value and a target color coordinate at a reference measurement point, measuring a first color luminance at a reference temperature using the first lookup table, measuring the first color luminance at a correction temperature using the first lookup table, generating a first color temperature correction value based on the first color luminance at the reference temperature and the first color luminance at the correction temperature, and performing gamma correction using the first color temperature correction value and the first lookup table.

However, the effects of the present invention are not limited to the above-described effects, and may be variously expanded without departing from the spirit and scope of the present invention.

BRIEF DESCRIPTION OF THE DRAWINGS

FIG. 12 is a table illustrating an example of voltage codes according to the gamma correction method of FIG. 10.

FIG. 13 is a table illustrating an example of position correction values according to FIG. 12.

FIG. 15 is a table illustrating an example of a ratio of luminance and a grayscale correction value according to the gamma correction method of FIG. 14.

FIG. 17 is a table illustrating an example of luminance according to the gamma correction method of FIG. 16.

FIG. 18 is a table illustrating an example of a temperature correction value according to the gamma correction method of FIG. 16.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
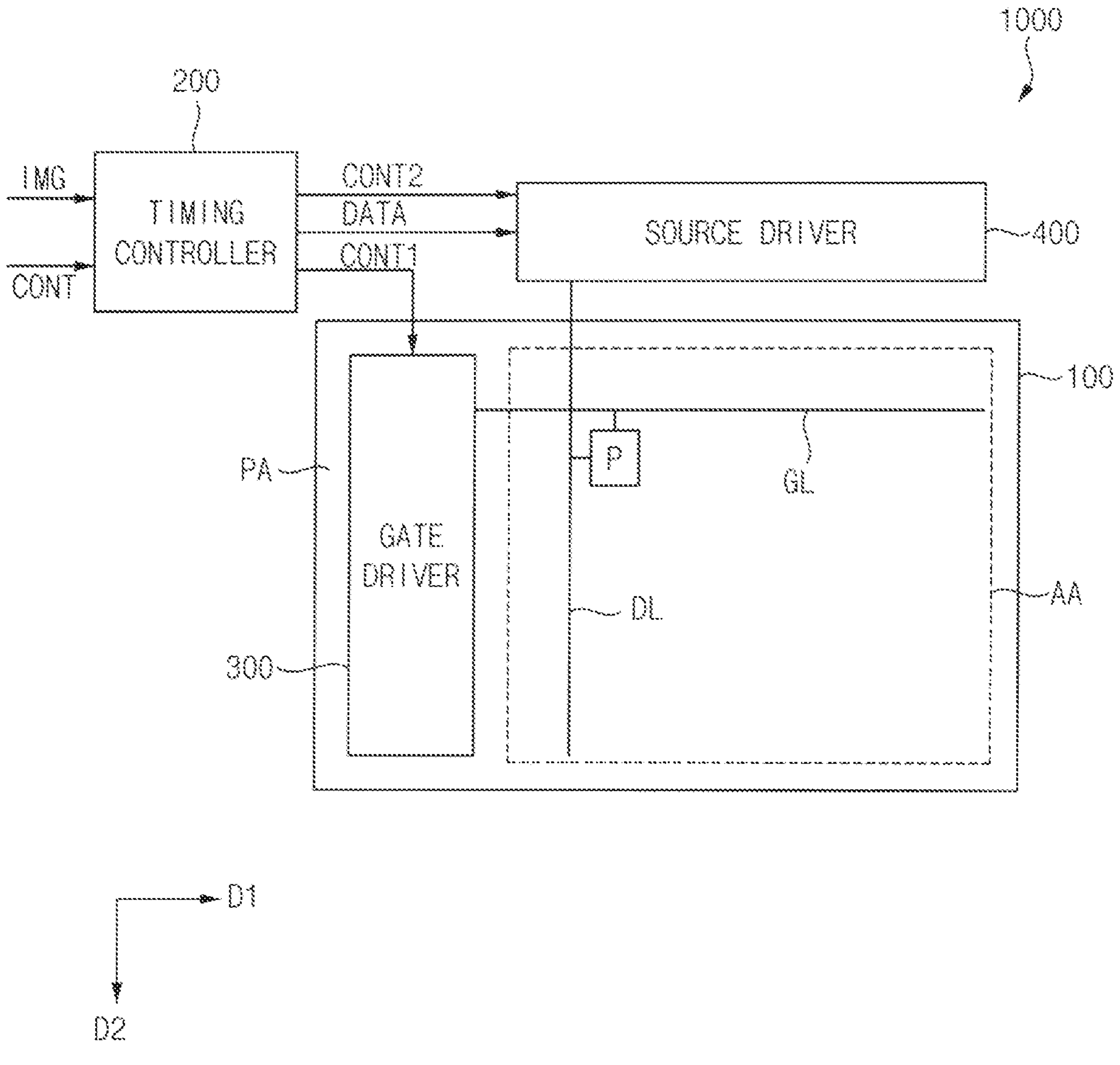
FIG. 1 is a block diagram illustrating a display device according to embodiments of the present invention.

FIG. 1 is a block diagram illustrating a display device 1000 according to embodiments of the present invention.

Referring to FIG. 1, the display device 1000 may include a display panel 100, a timing controller 200, a gate driver 300, and a source driver 400. In an embodiment, the timing controller 200 and the source driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; "GPU"). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the source driver 400 based on the input control signal CONT and output the second control signal CONT2 to the source driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the source driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The source driver 400 may receive the second control signal CONT2 and the data signal DATA from the timing controller 200. The source driver 400 may convert the data signal DATA into data voltages having an analog type. The source driver 400 may output the data voltage to the data lines DL.

Figure 2:
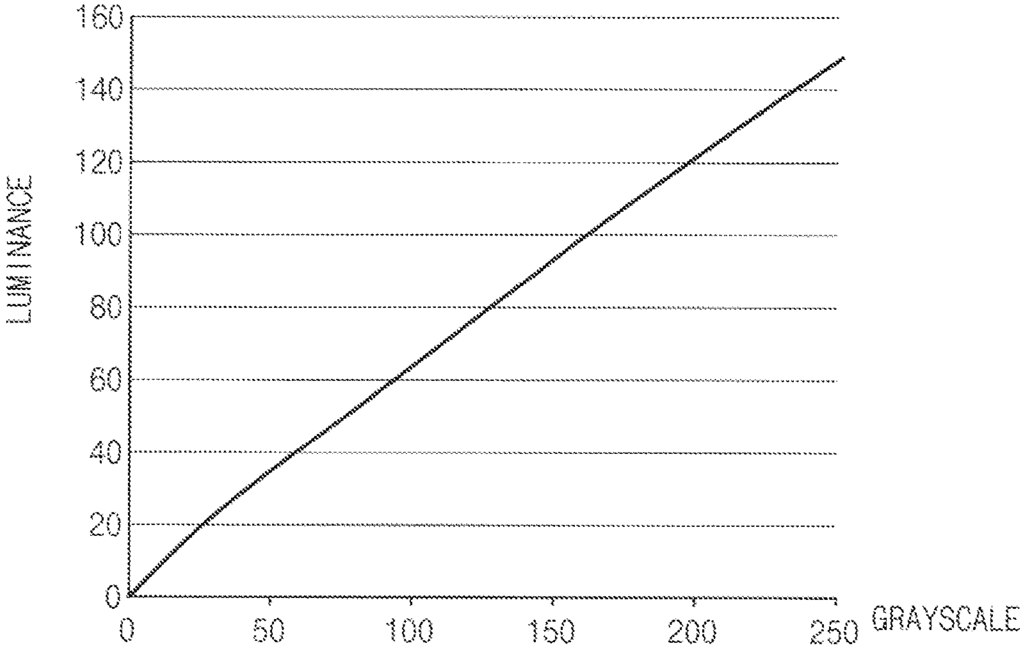
FIG. 2 is a graph illustrating an example of luminance according to a grayscale value before a gamma correction of the display device of FIG. 1.
Figure 3:
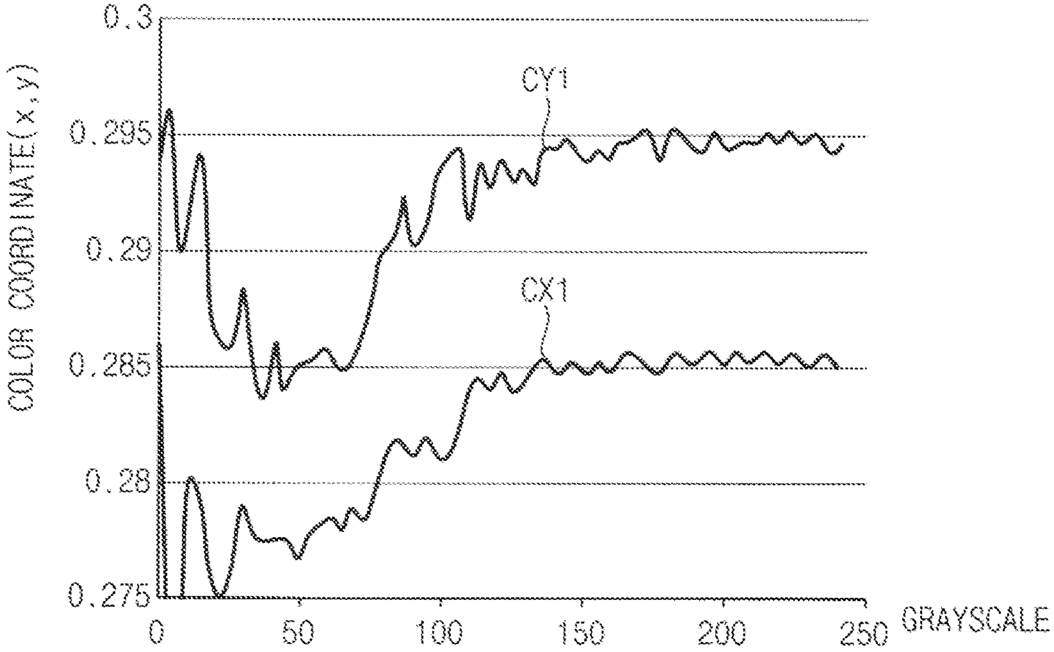
FIG. 3 is a graph illustrating an example of a color coordinate according to a grayscale value before a gamma correction of the display device of FIG. 1.
Figure 4:
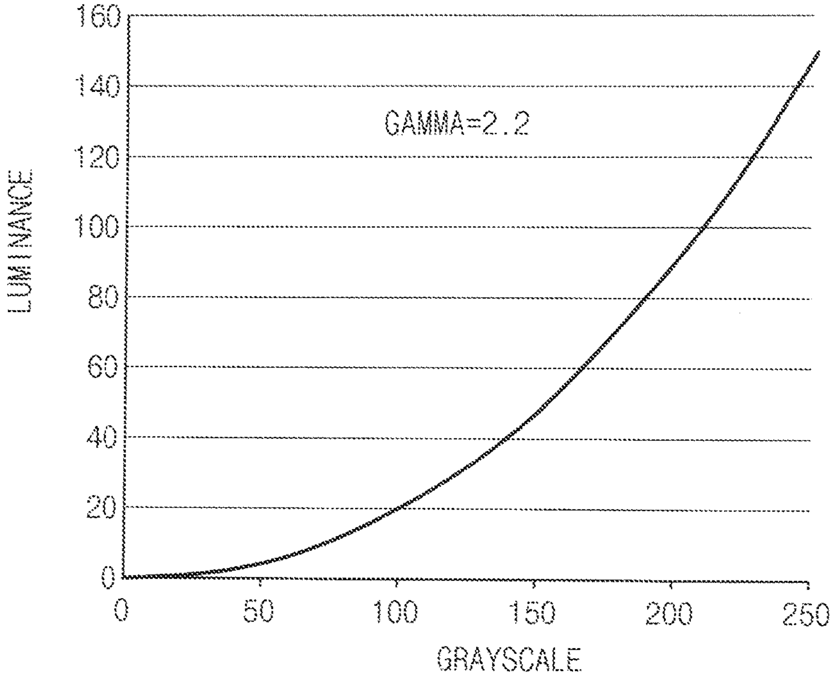
FIG. 4 is a graph illustrating an example of ideal luminance according to a grayscale value after a gamma correction of the display device of FIG. 1.
Figure 5:
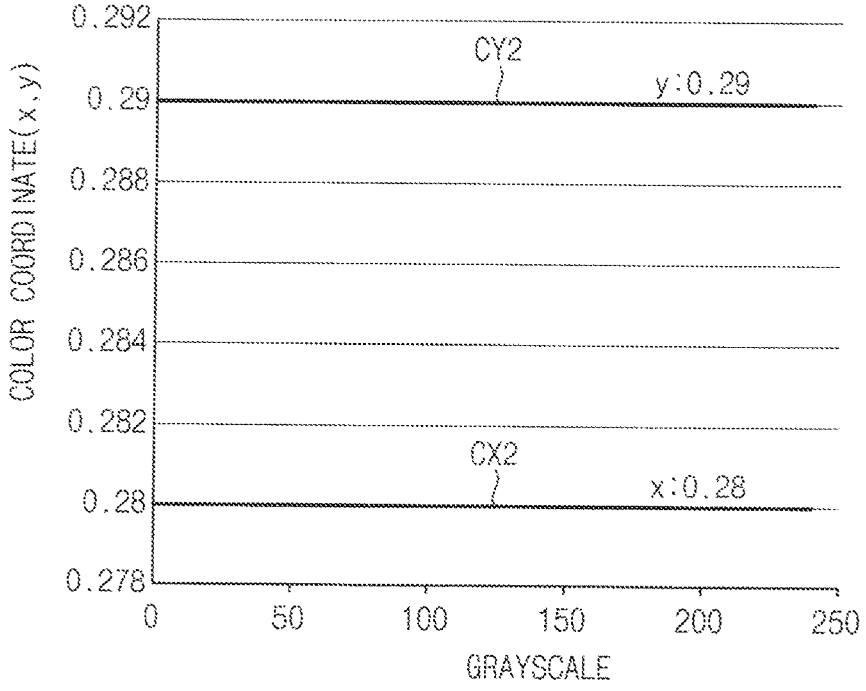
FIG. 5 is a graph illustrating an example of an ideal color coordinate according to a grayscale value after a gamma correction of the display device of FIG. 1.

FIG. 2 is a graph illustrating an example of luminance according to a grayscale value before a gamma correction of the display device 1000 of FIG. 1, FIG. 3 is a graph illustrating an example of a color coordinate according to the grayscale value before the gamma correction of the display device 1000 of FIG. 1, FIG. 4 is a graph illustrating an example of ideal luminance according to the grayscale value after the gamma correction of the display device of FIG. 1, and FIG. 5 is a graph illustrating an example of an ideal color coordinate according to the grayscale value after the gamma correction of the display device of FIG. 1. FIGS. 2 to 5, it is exemplified that the number of the grayscale of the input image data IMG is 256 ranging from 0 grayscale value to 255 grayscale value. The grayscale value on a x-axis of FIGS. 2 to 5 represent a grayscale value when the grayscale values of all colors are the same (i.e., white grayscale value).

As shown in FIG. 2, the luminance according to the grayscale value before the gamma correction shows a generally linear graph. That is, in FIG. 2, as the grayscale value increases, the luminance may increase substantially linearly.

When the gamma correction is performed by setting a target gamma value to 2.2, the luminance according to the grayscale value is a non-linear graph as shown in FIG. 4. That is, in FIG. 4, the luminance may increase nonlinearly as the grayscale value increases.

As shown in FIG. 3, the color coordinate according to the grayscale value do not have a constant value before the gamma correction. In FIG. 3, CX1 represents an x color coordinate, and CY1 represents a y color coordinate.

When the gamma correction is performed by setting a target color coordinate (x, y) to (0.28, 0.29), the color coordinate according to the grayscale value may have a constant value as shown in FIG. 5. In FIG. 5, CX2 represents an x color coordinate, CY2 represents a y color coordinate, CX2 has 0.28, and CY2 has 0.29.

However, FIG. 5 exemplifies a case in which the gamma correction is ideally performed, and in an actual display panel, the color coordinate corrected by the gamma correction may not be uniform in an entire grayscale region. The case in which the color coordinate corrected by the gamma correction is not uniform in the entire grayscale region will be described later with reference to FIGS. 6 to 8.

Figure 6:
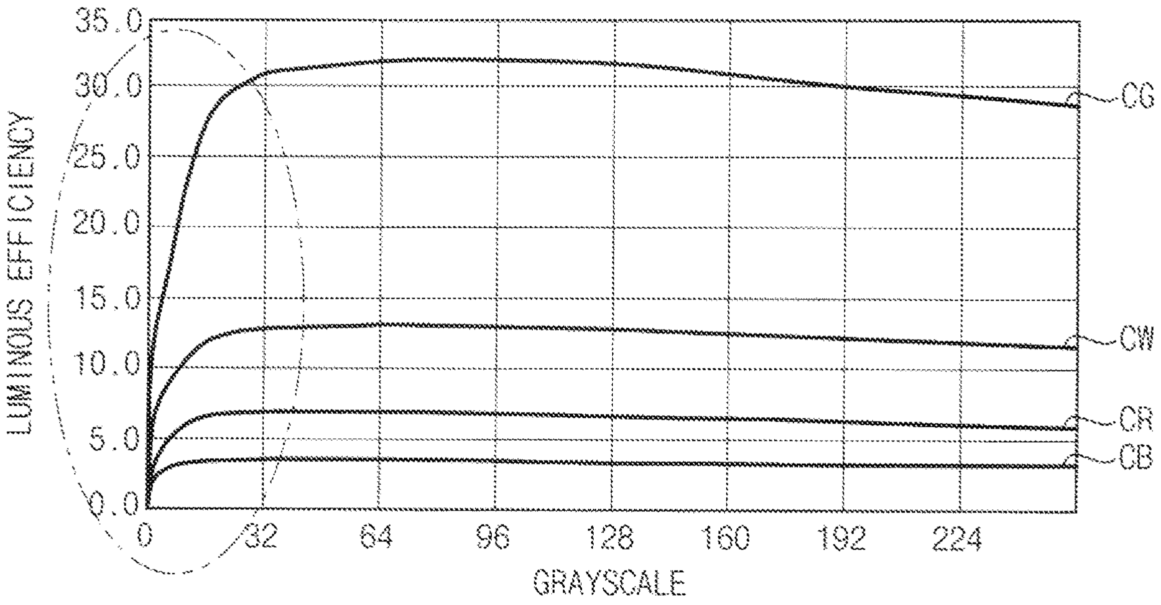
FIG. 6 is a graph illustrating luminous efficiency of red, green, blue, and white according to a grayscale value of the display panel of FIG. 1.
Figure 7:
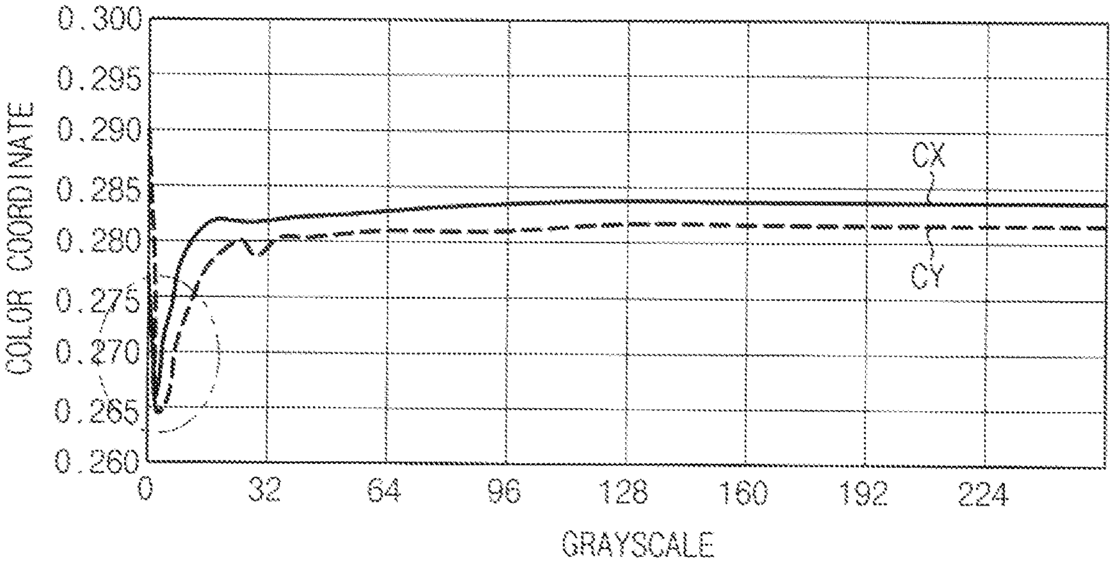
FIG. 7 is a graph illustrating an example of an actual color coordinate according to a grayscale value after a gamma correction of the display device of FIG. 1.
Figure 8:
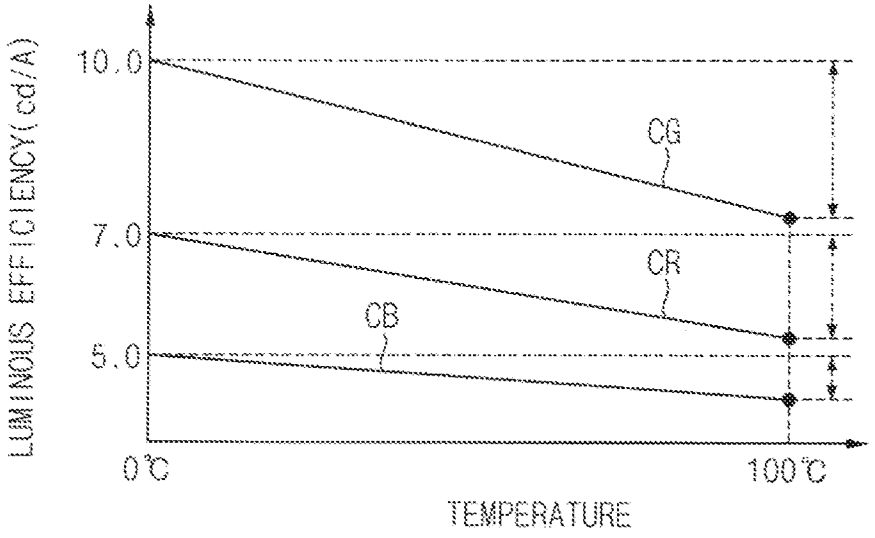
FIG. 8 is a graph illustrating luminous efficiency according to a temperature of a display panel.
Figure 9:
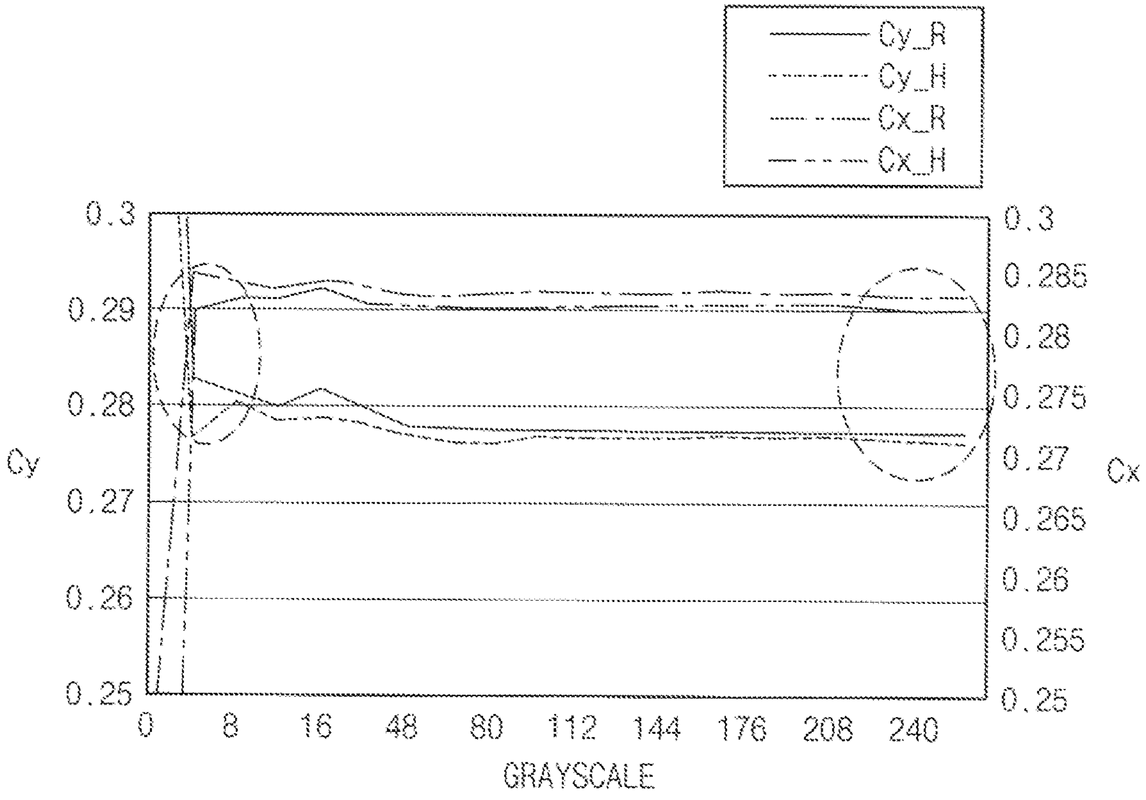
FIG. 9 is a graph illustrating an example of an actual color coordinate according to a temperature after a gamma correction of the display device of FIG. 1.

FIG. 6 is a graph illustrating luminous efficiency of red, green, blue, and white according to the grayscale value of the display panel 100 of FIG. 1, FIG. 7 is a graph illustrating an example of an actual color coordinate according to the grayscale value after the gamma correction of the display device of FIG. 1, FIG. 8 is a graph illustrating the luminous efficiency according to a temperature of the display panel 100, and FIG. 9 is a graph illustrating an example of the actual color coordinate according to the temperature after the gamma correction of the display device of FIG. 1. The grayscale value on a x-axis of FIGS. 6, 7, and 9 represent the grayscale value when the grayscale values of all colors are the same (i.e., the white grayscale value).

Referring to FIGS. 6 and 7, a red luminous efficiency of the display panel 100 according to the grayscale value is represented by CR, a green luminous efficiency of the display panel 100 according to the grayscale value is represented by CG, and a blue luminous efficiency of the display panel 100 according to the grayscale value is represented by CB, and a white luminous efficiency of the display panel 100 according to the grayscale value is represented by CW. In FIG. 6, the luminous efficiency represents luminous intensity according to a driving current, and a unit of the luminous efficiency may be candela/ampere (cd/A).

As shown in FIG. 6, the red luminous efficiency CR, the green luminous efficiency CG, the blue luminous efficiency CB, and the white luminous efficiency CW may be relatively uniform in 32 grayscale value or more. On the other hand, in a low grayscale region smaller than 32 grayscale value, the red luminous efficiency CR, the green luminous efficiency CG, the blue luminous efficiency CB, and the white luminous efficiency CW may not be uniform.

In 32 grayscale value or more, the green luminous efficiency CG may have a greater value than the red luminous efficiency CR and the blue luminous efficiency CB by a substantially constant ratio.

On the other hand, in the low grayscale region smaller than 32 grayscale value, a degree to which the green luminous efficiency CG is greater than the red luminous efficiency CR and the blue luminous efficiency CB may not be uniform. In addition, in the low grayscale region smaller than 32 grayscale value, a degree to which the green luminous efficiency CG is greater than the red luminous efficiency CR and the blue luminous efficiency CB may be smaller than the degree in the high grayscale region greater than 32 grayscale value.

For this reason, after the gamma correction is performed, the x color coordinate Cx and the y color coordinate Cy may have uniform values in the high grayscale region of 32 grayscale value or more, whereas the x color coordinate Cx and the y color coordinate Cy may not have uniform values in the low grayscale region smaller than 32 grayscale value.

As described above, since the luminous efficiency of the display panel 100 is different for each grayscale values, a color coordinate shift may occur at a low grayscale value. When the color coordinate shift occurs in the low grayscale value, the color coordinate of the high grayscale value and the color coordinate of the low grayscale value may be different, and thus a display quality of the display panel 100 may deteriorate.

Referring to FIGS. 8 and 9, the x color coordinate of the display panel 100 at a room temperature (e.g., 25° C.) is represented by Cx_R, they color coordinate of the display panel 100 at the room temperature is represented by Cy_R, the x color coordinate of the display panel 100 at a high temperature (e.g., 100° C.) is represented by Cx_H, and the y color coordinate of the display panel 100 at the high temperature is represented by Cy_H. In FIG. 8, the luminous efficiency represents the luminous intensity according to the driving current, and the unit of the luminous efficiency may be candela/ampere (cd/A).

As shown in FIG. 8, the red luminous efficiency CR, the green luminous efficiency CG, and the blue luminous efficiency CB may not be uniform according to the temperature of the display panel 100. As the temperature of the display panel 100 increases, the red luminous efficiency CR, the green luminous efficiency CG, and the blue luminous efficiency CB may decrease. For this reason, after the gamma correction is performed, the x color coordinate Cx and the y color coordinate Cy may not have uniform values according to the temperature.

As such, since the luminous efficiency of the display panel 100 is different for each temperature, the color coordinate shift may occur. When the color coordinate shift occurs, the color coordinate at the high temperature and the color coordinate at the room temperature may be different, and thus the display quality of the display panel 100 may deteriorate.

Also, the color coordinate shift may occur due to a deviation according to a position in the display panel 100, and the display quality of the display panel 100 may deteriorate due to the color coordinate shift. A detailed description thereof will be given later.

Figure 10:
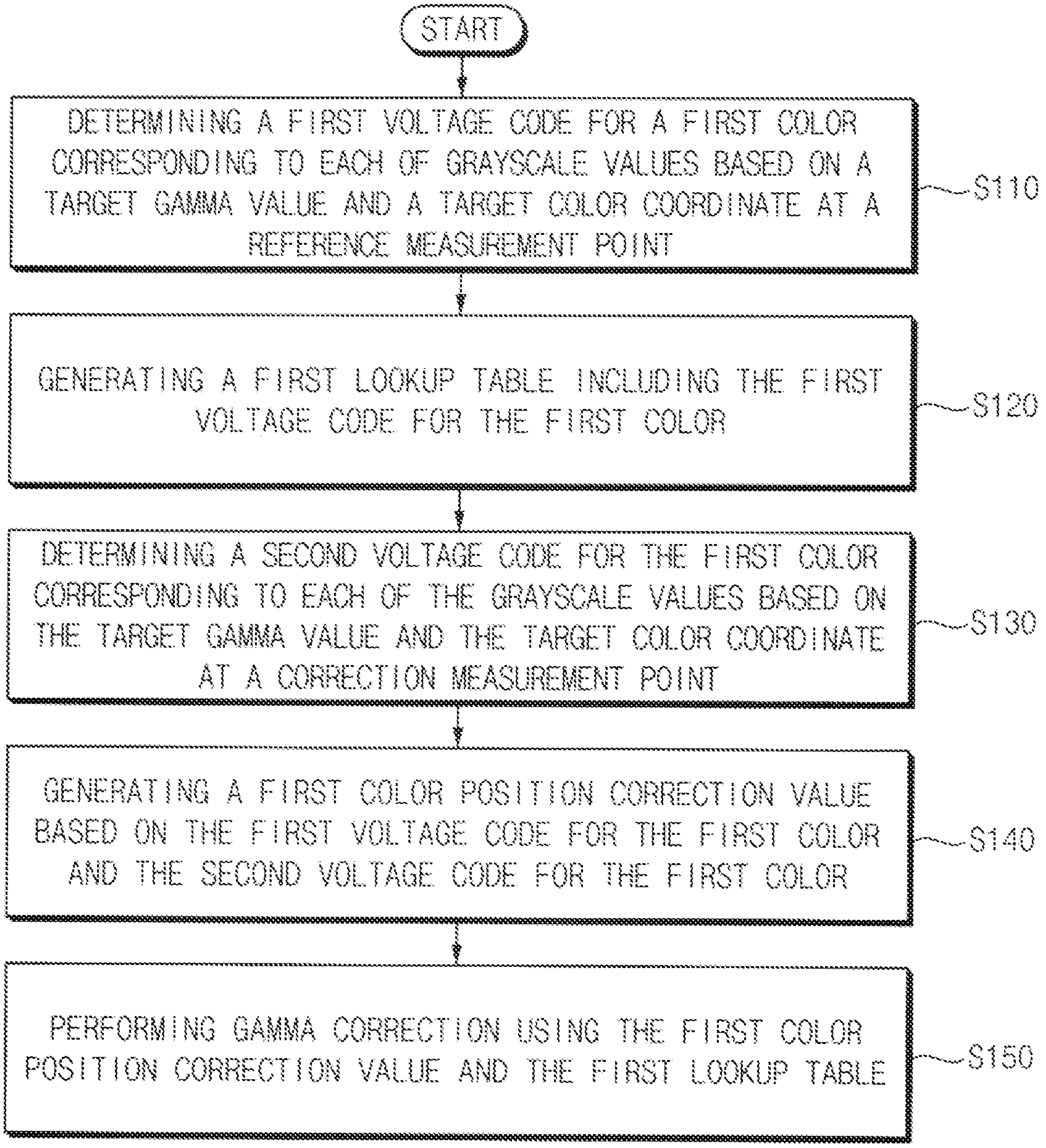
FIG. 10 is a flowchart illustrating a gamma correction method for a display device according to embodiments of the present invention.
Figure 11:
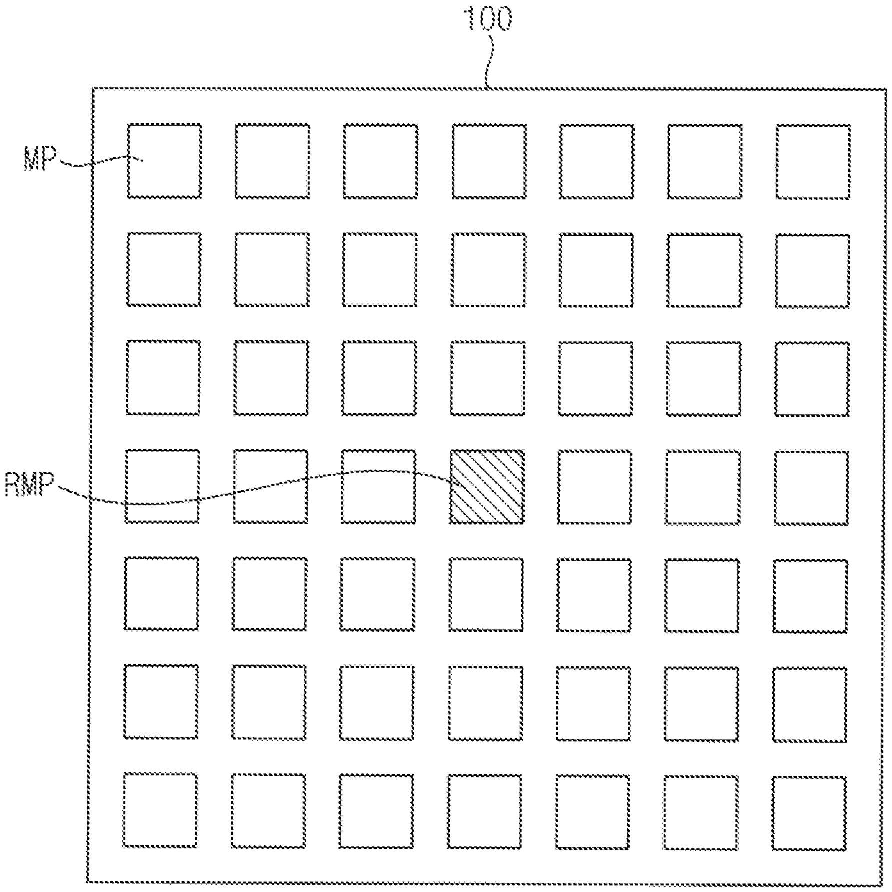
FIG. 11 is a diagram illustrating an example of measurement points according to the gamma correction method of FIG. 10.

FIG. 10 is a flowchart illustrating a gamma correction method for a display device according to embodiments of the present invention, FIG. 11 is a diagram illustrating an example of measurement points MP according to the gamma correction method of FIG. 10, FIG. 12 is a table illustrating an example of voltage codes according to the gamma correction method of FIG. 10, and FIG. 13 is a table illustrating an example of position correction values according to FIG. 12.

Referring to FIGS. 1, and 10 to 13, the gamma correction method of FIG. 10 may determine a first voltage code CODE1_R for a first color corresponding to each of the grayscale values based on a target gamma value and a target color coordinate at a reference measurement point RMP (S110), generate a first lookup table including the first voltage code CODE1_R for the first color (S120), determine a second voltage code CODE2_R for the first color corresponding to each of the grayscale values based on the target gamma value and the target color coordinate at a correction measurement point CMP (S130), generate a first color position correction value LCV_R based on the first voltage code CODE1_R for the first color and the second voltage code CODE2_R for the first color (S140), and perform the gamma correction using the first color position correction value LCV_R and the first lookup table (S150).

Specifically, the gamma correction method of FIG. 10 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120). The reference measurement point RMP may be a measurement point MP serving as a reference of the first lookup table. For example, the reference measurement point RMP may be the most centrally disposed measurement point MP among the measurement points MP. The gamma correction may be performed based on the luminance and the color coordinate measured at the reference measurement point RMP. That is, the first voltage code CODE1_R, CODE1_G, and CODE1_B may be determined such that the target gamma value and the target color coordinate are achieved at the reference measurement point RMP. The second voltage code CODE2_R, CODE2_G, and CODE2_B may be determined in the same manner as the first voltage code CODE1_R, CODE1_G, and CODE1_B at the correction measurement point CMP.

The first lookup table may include the first voltage code CODE1_R, CODE1_G, and CODE1_B for which the color coordinate shift according to the grayscale value, the temperature, and the position in the display panel 100 are not corrected. That is, the first lookup table may be generated according to only the target gamma value and the target color coordinate. Therefore, as described with reference to FIGS. 2 to 9, when the display device 1000 performs the gamma correction using only the first lookup table, the color coordinate shift may occur according to the grayscale value, the temperature, and the position in the display panel 100. Here, the voltage codes (e.g., the first voltage code CODE1_R, CODE1_G, and CODE1_B, the second voltage code CODE2_R, CODE2_G, and CODE2_B, and a correction voltage code) may be a value corresponding to the data voltage applied to the pixel P to display respective grayscale values. That is, the larger voltage code may mean a higher voltage value.

Specifically, the gamma correction method of FIG. 10 may determine the second voltage code CODE2_R for the first color corresponding to each of the grayscale values based on the target gamma value and the target color coordinate at the correction measurement point CMP (S130), and may generate the first color position correction value LCV_R based on the first voltage code CODE1_R for the first color and the second voltage code CODE2_R for the first color (S140).

In an embodiment, the first color position correction value LCV_R may be determined by dividing the second voltage code CODE2_R for the first color by the first voltage code CODE1_R for the first color. That is, the first color position correction value LCV_R may be a ratio of the second voltage code CODE2_R to the first voltage code CODE1_R for the first color. For example, it is assumed that the first voltage code CODE1_R for the first color of 16 grayscale value is 1252 at the reference measurement point RMP, and the second voltage code CODE2_R for the first color of 16 grayscale value is 1297 at the correction measurement point CMP (i.e., the measurement point MP at which the gamma correction is to be performed). In this case, the first color position correction value LCV_R may be determined to be 1.04 ((1297)/(1252)=about 1.04).

Specifically, the gamma correction method of FIG. 10 may perform the gamma correction using the first color position correction value LCV_R and the first lookup table (S150). When the gamma correction is performed based on only the first lookup table and a correction value (e.g., a grayscale correction value and a temperature correction value) generated based on the reference measurement point RMP, since the first lookup table and the correction value is based on the reference measurement point RMP, the color coordinate shift may occur at different positions in the display panel 100 (i.e., at the measurement points MP except for the reference measurement point RMP). Accordingly, the display device may effectively prevent the color coordinate shift according to the position in the display panel 100 by performing the gamma correction using the first lookup table, the correction value generated based on the reference measurement point RMP, and the position correction values LCV_R, LCV_G, and LCV_B.

Specific details in which the position correction values LCV_R, LCV_G, and LCV_B are used will be described with reference to FIGS. 19 to 22.

The gamma correction method of FIG. 10 may also determine a first voltage code CODE1_G for a second color and a first voltage code CODE1_B for a third color corresponding to each of the grayscale values based on the target gamma value and the target color coordinate at the reference measurement point RMP, determine a second voltage code CODE2_G for the second color and a second voltage code CODE_B for the third color corresponding to each of the grayscale values based on the target gamma value and the target color coordinate at the correction measurement point CMP, generate a second color position correction value LCV_G based on the first voltage code CODE1_G for the second color and the second voltage code CODE2_G for the second color, and generate a third color position correction value LCV_B based on the first voltage code CODE1_B for the third color and the second voltage code CODE2_B for the third color. The first lookup table may include the first voltage code CODE1_G for the second color and the first voltage code CODE1_B for the third color, and the gamma correction may be performed using the second color position correction value LCV_G and the third color position correction value LCV_B.

The first color may be red, the second color may be green, and the third color may be blue. Since the gamma correction for the second color and the gamma correction for the third color are substantially the same as the gamma correction for the first color, any repetitive explanation will be omitted.

Figure 14:
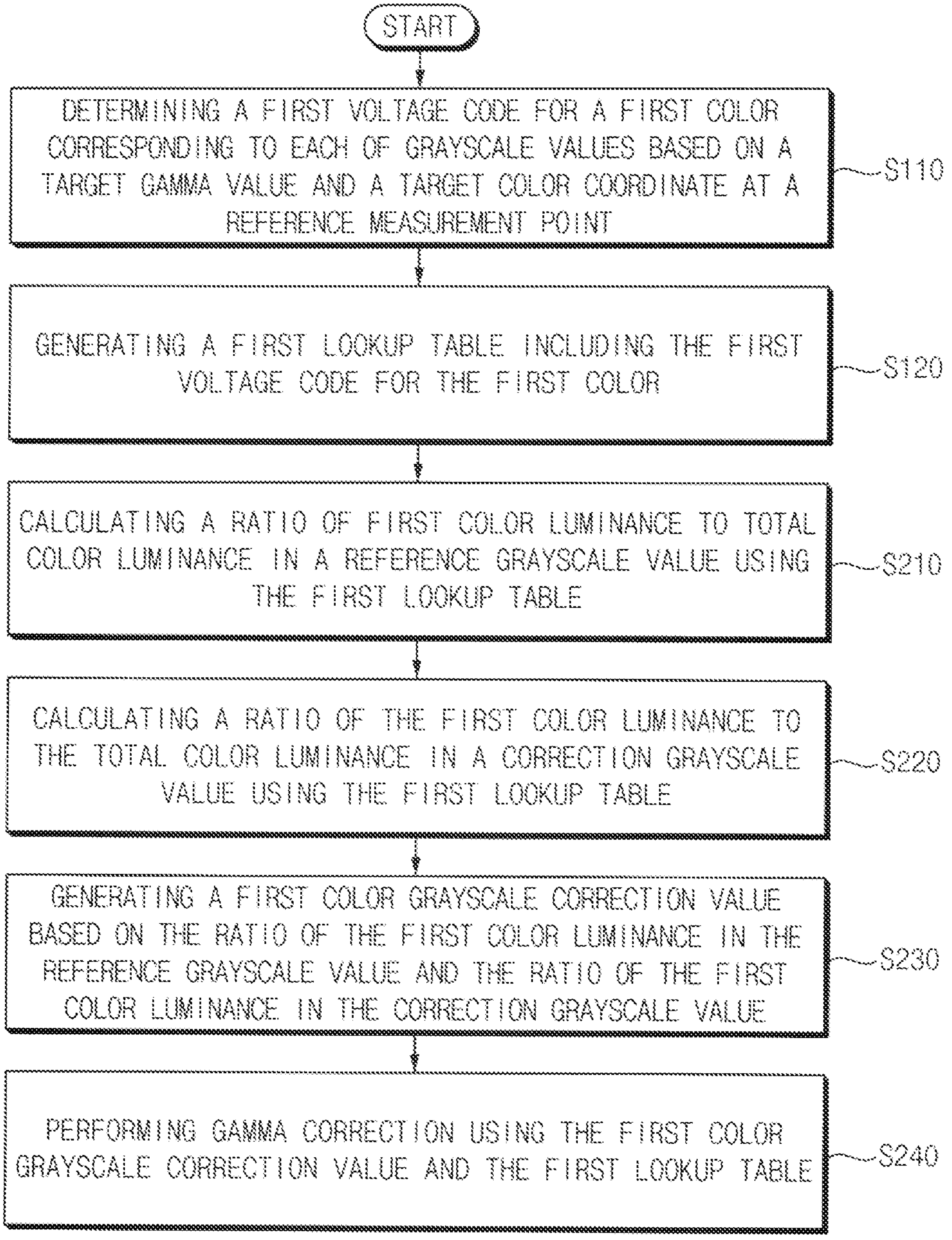
FIG. 14 is a flowchart illustrating a gamma correction method for a display device according to embodiments of the present invention.

FIG. 14 is a flowchart illustrating a gamma correction method for a display device according to embodiments of the present invention, and FIG. 15 is a table illustrating an example of a ratio of luminance and a grayscale correction value according to the gamma correction method of FIG. 14.

The gamma correction method according to the present embodiment is substantially the same as the gamma correction method of FIG. 10 except for generating the grayscale correction value. Thus, the same reference numerals are used to refer to the same or similar element, and any repetitive explanation will be omitted.

Referring to FIGS. 1, 12, 14, and 15, the gamma correction method of FIG. 14 may determine the first voltage code CODE1_R for the first color corresponding to each of the grayscale values based on the target gamma value and the target color coordinate at the reference measurement point RMP (S110), generate the first lookup table including the first voltage code CODE1_R for the first color (S120), calculate a ratio R_R of first color luminance to total color luminance in a reference grayscale value RG using the first lookup table (S210), calculate a ratio R_R of the first color luminance to the total color luminance in a correction grayscale value CG using the first lookup table (S220), and generate a first color grayscale correction value GCV_R based on the ratio R_R of the first color luminance in the reference grayscale value RG and the ratio R_R of the first color luminance in the correction grayscale value CG (S230), and perform the gamma correction using the first color grayscale correction value GCV_R and the first lookup table (S240).

Specifically, the gamma correction method of FIG. 14 may calculate the ratio R_R of the first color luminance to the total color luminance in the reference grayscale value RG using the first lookup table (S210), calculate the ratio R_R of the first color luminance to the total color luminance in the correction grayscale value CG using the first lookup table (S220), and generate the first color grayscale correction value GCV_R based on the ratio R_R of the first color luminance in the reference grayscale value RG and the ratio R_R of the first color luminance in the correction grayscale value CG (S230). For example, in the gamma correction method of the display device of FIG. 14, the data voltages corresponding to the first voltage code CODE1_R, CODE1_G, and CODE1_B included in the first lookup table may be applied to the pixels P, and then may measure the total color luminance and the first color luminance. For example, the ratio R_R of the first color luminance may be calculated based on the measured first color luminance and the measured total color luminance.

In an embodiment, the reference grayscale value RG may be a maximum grayscale value (e.g., 255). Accordingly, the reference grayscale RG may be greater than or equal to the correction grayscale value CG.

In an embodiment, the total color luminance in a specific grayscale value may be a sum of the first color luminance, a second color luminance, and a third color luminance in the specific grayscale. In another embodiment, the total color luminance at the specific grayscale value may be luminance of a white image (i.e., luminance of the white grayscale value) at the specific grayscale value.

In an embodiment, the first color grayscale correction value GCV_R may be determined by dividing the ratio R_R of the first color luminance in the correction grayscale value CG by the ratio R_R of the first color luminance in the reference grayscale value RG. For example, it is assumed that the ratio R_R of the first color luminance in the reference grayscale value RG is 0.22, and the ratio R_R of the first color luminance in the correction grayscale value CG (i.e., the grayscale value to which the gamma correction is to be performed) is 0.21. In this case, the first color grayscale correction value GCV_R may be determined to be 0.98 ((0.21)/(0.22)=about 0.98).

Specifically, the gamma correction method of FIG. 14 may perform the gamma correction using the first color grayscale correction value GCV_R and the first lookup table (S240). In an embodiment, the gamma correction method of FIG. 14 may generate a correction voltage code for the first color based on the product of the first voltage code CODE1_R for the first color and the first color grayscale correction value GCV_R (e.g., by multiplying the first voltage code CODE1_R for the first color by the first color grayscale correction value GCV_R), generate the second lookup table including the correction voltage code for the first color, and perform the gamma correction using the second lookup table.

For example, it is assumed that the first voltage code CODE1_R for the first color of 64 grayscale value is 1975 at the reference measurement point RMP, and the first color grayscale correction value GCV_R of 64 grayscale value is 0.98. In this case, the correction voltage code for the first color of 64 grayscale value may be 1935 ((1975)*(0.98) =about 1935). Accordingly, when the gamma correction is performed based on the second lookup table, the data voltage corresponding to a voltage code of 1935 may be applied to the pixel P for displaying the first color of 64 grayscale value. Accordingly, the display device may effectively prevent the color coordinate shift according to the grayscale value.

The gamma correction method of FIG. 14 may determine the first voltage code CODE1_G for the second color corresponding to each of the grayscale values based on the target gamma value and the target color coordinate at the reference measurement point RMP, calculate the ratio R_G of the second color luminance to the total color luminance at the reference grayscale value RG using the first lookup table, The gamma correction method of FIG. 14 may determine the first voltage code CODE1_G for the second color corresponding to each of the grayscale values based on the target gamma value and the target color coordinate at the reference measurement point RMP, generate the first lookup table including the first voltage code CODE1_G for the second color, calculate a ratio R_G of second color luminance to the total color luminance in the reference grayscale value RG using the first lookup table, calculate a ratio R_G of the second color luminance to the total color luminance in the correction grayscale value CG using the first lookup table, and generate a second color grayscale correction value GCV_G based on the ratio R_G of the second color luminance in the reference grayscale value RG and the ratio R_G of the second color luminance in the correction grayscale value CG, and perform the gamma correction using the second color grayscale correction value GCV_G and the first lookup table.

The gamma correction method of FIG. 14 may determine the first voltage code CODE1_B for the third color corresponding to each of the grayscale values based on the target gamma value and the target color coordinate at the reference measurement point RMP, generate the first lookup table including the first voltage code CODE1_B for the third color, calculate a ratio R_B of third color luminance to the total color luminance in the reference grayscale value RG using the first lookup table, calculate a ratio R_B of the third color luminance to the total color luminance in the correction grayscale value CG using the first lookup table, and generate a third color grayscale correction value GCV_B based on the ratio R_B of the third color luminance in the reference grayscale value RG and the ratio R_B of the third color luminance in the correction grayscale value CG, and perform the gamma correction using the third color grayscale correction value GCV_B and the first lookup table.

Since the gamma correction for the second color and the gamma correction for the third color is substantially the same as the gamma correction for the first color, any repetitive explanation will be omitted.

Figure 16:
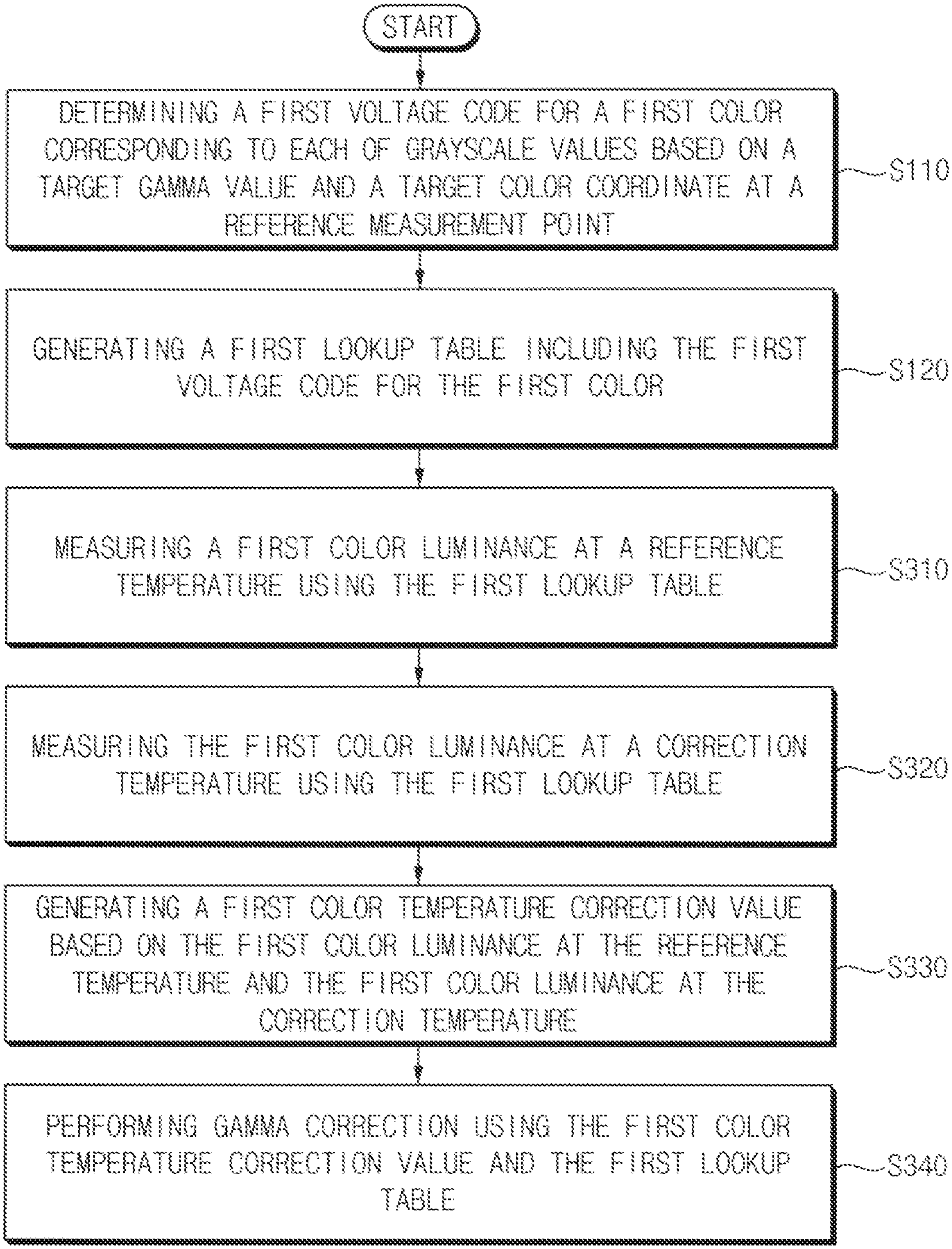
FIG. 16 is a flowchart illustrating a gamma correction method for a display device according to embodiments of the present invention.

FIG. 16 is a flowchart illustrating a gamma correction method for a display device according to embodiments of the present invention, FIG. 17 is a table illustrating an example of luminance according to the gamma correction method of FIG. 16, and FIG. 18 is a table illustrating an example of a temperature correction value according to the gamma correction method of FIG. 16.

The gamma correction method according to the present embodiment is substantially the same as the gamma correction method of FIG. 10 except for generating the temperature correction value. Thus, the same reference numerals are used to refer to the same or similar element, and any repetitive explanation will be omitted.

Referring to FIGS. 1, 12, and 16 to 18, the gamma correction method of FIG. 16 may determine the first voltage code CODE1_R for the first color corresponding to each of the grayscale values based on the target gamma value and the target color coordinate at the reference measurement point RMP (S110), generate the first lookup table including the first voltage code CODE1_R for the first color (S120), measure a first color luminance L_R at a reference temperature RT using the first lookup table (S310), measure the first color luminance L_R at a correction temperature CT using the first lookup table (S320), generate a first color temperature correction value TCV_R based on the first color luminance L_R at the reference temperature RT and the first color luminance L_R at the correction temperature CT (S330), and perform the gamma correction using the first color temperature correction value TCV_R and the first lookup table (S340).

Specifically, the gamma correction method of FIG. 16 may measure a first color luminance L_R at a reference temperature RT using the first lookup table (S310), measure the first color luminance L_R at a correction temperature CT using the first lookup table (S320), and generate a first color temperature correction value TCV_R based on the first color luminance L_R at the reference temperature RT and the first color luminance L_R at the correction temperature CT (S330). For example, in the gamma correction method of FIG. 16, the data voltages corresponding to the first voltage code CODE1_R, CODE1_G, and CODE1_B included in the first lookup table may be applied to the pixels P, and then the first color luminance L_R may be measured. In an embodiment, the first color luminance L_R may be measured at the reference measurement point RMP. In an embodiment, the reference temperature RT may be a room temperature.

In an embodiment, the first color temperature correction value TCV_R may be determined by dividing the first color luminance L_R at the reference temperature RT by the first color luminance L_R at the correction temperature CT. For example, it is assumed that the first color luminance L_R at the reference temperature RT is 0.8378 nit, and the first color luminance L_R at the correction temperature CT (i.e., the temperature at which the gamma correction is to be performed) is 0.744 nit. In this case, the first color temperature correction value TCV_R may be determined to be 1.13 ((0.8378)/(0.744)=about 1.13).

The gamma correction method of FIG. 16 may perform the gamma correction using the first color temperature correction value TCV_R and the first lookup table (S340). In an embodiment, the gamma correction method of FIG. 16 may generate a correction voltage code for the first color based on the product of the first voltage code CODE1_R for the first color and the first color temperature correction value TCV_R (e.g., by multiplying the first voltage code CODE1_R for the first color by the first color temperature correction value TCV_R), generate the second lookup table including the correction voltage code for the first color, and perform the gamma correction using the second lookup table.

For example, it is assumed that the first voltage code CODE1_R of 16 grayscale value first color is 1252 at the reference measurement point RMP, and the first color temperature correction value TCV_R of 16 grayscale value is 1.13. In this case, the correction voltage code for the first color of 16 grayscale value may be 1415 ((1252)*(1.13) =about 1415). Accordingly, when the gamma correction is performed based on the second lookup table, the data voltages corresponding to a voltage code of 1415 may be applied to the pixel P for displaying the first color of 16 grayscale value. Accordingly, the display device may effectively prevent the color coordinate shift according to a temperature.

The gamma correction method of FIG. 16 may determine the first voltage code CODE1_G for the second color corresponding to each of the grayscale values based on the target gamma value and the target color coordinate at the reference measurement point RMP, generate the first lookup table including the first voltage code CODE1_G for the second color, measure a second color luminance L_G at the reference temperature RT using the first lookup table, measure the second color luminance L_G at the correction temperature CT using the first lookup table, and generate a second color temperature correction value TCV_G based on the second color luminance L_G at the reference temperature RT and the second color luminance L_G at the correction temperature CT. The first lookup table may include the first voltage code CODE1_G for the second color, and the gamma correction may be performed using the second color temperature correction value TCV_G and the first lookup table.

The gamma correction method of FIG. 16 may determine the first voltage code CODE1_B for the third color corresponding to each of the grayscale values based on the target gamma value and the target color coordinate at the reference measurement point RMP, generate the first lookup table including the first voltage code CODE1_B for the third color, measure a third color luminance L_B at the reference temperature RT using the first lookup table, measure the third color luminance L_B at the correction temperature CT using the first lookup table, and generate a third color temperature correction value TCV_B based on the third color luminance L_B at the reference temperature RT and the third color luminance L_B at the correction temperature CT. The first lookup table may include the first voltage code CODE1_B for the third color, and the gamma correction may be performed using the third color temperature correction value TCV_B and the first lookup table.

Since the gamma correction for the second color and the gamma correction for the third color is substantially the same as the gamma correction for the first color, any repetitive explanation will be omitted.

Figure 19:
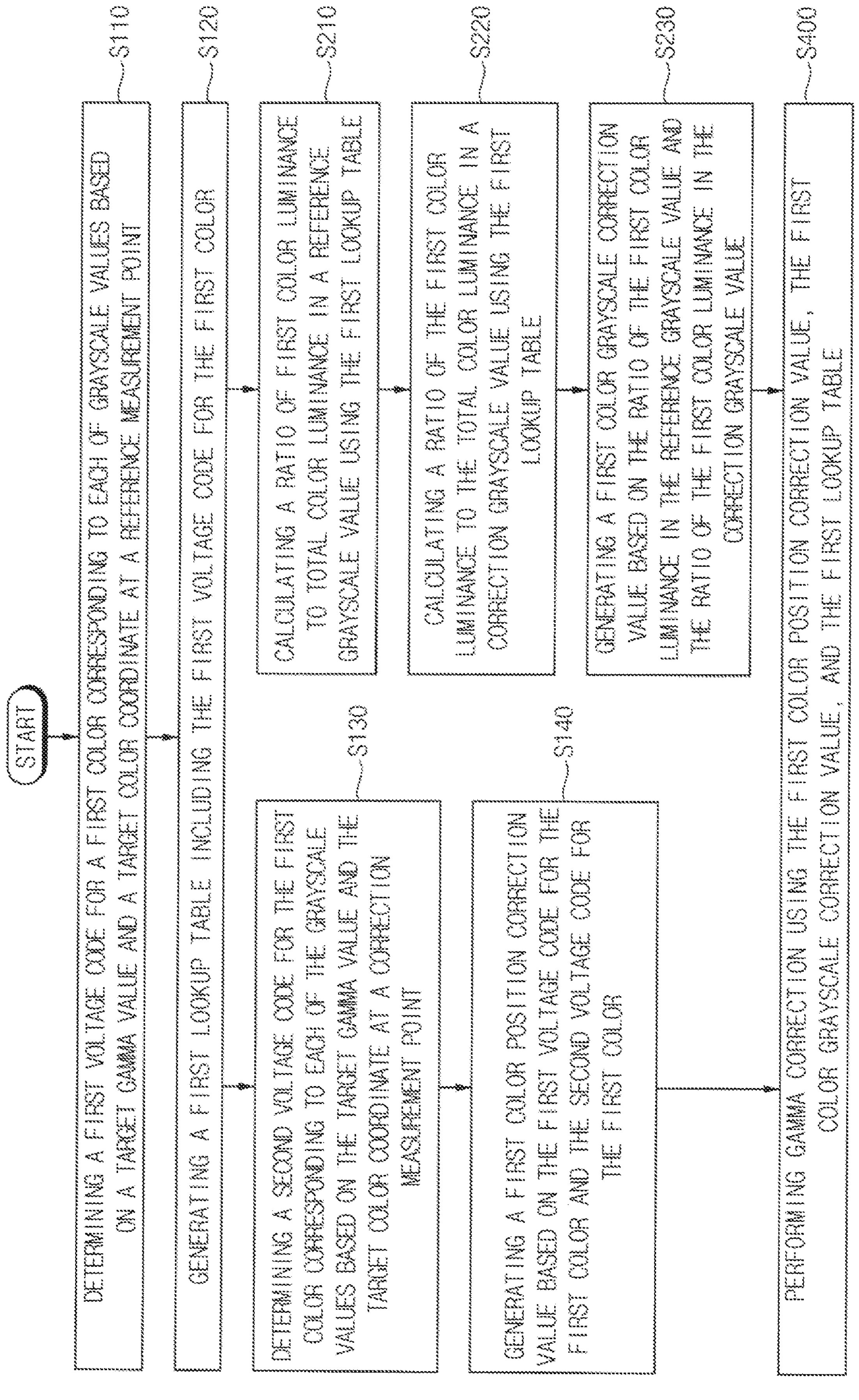
FIG. 19 is a flowchart illustrating a gamma correction method for a display device according to embodiments of the present invention.

FIG. 19 is a flowchart illustrating a gamma correction method for a display device according to embodiments of the present invention.

The gamma correction method according to the present embodiment is substantially the same as the gamma correction method of FIGS. 10 and 14 except for correction values used in the gamma correction. Thus, the same reference numerals are used to refer to the same or similar element, and any repetitive explanation will be omitted.

Referring to FIGS. 1, 12, 13, 15, and 19, the gamma correction method of FIG. 19 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120), determine the second voltage code CODE2_R for the first color corresponding to each of the grayscale values based on the target gamma value and the target color coordinate at the correction measurement point CMP (S130), generate the first color position correction value LCV_R based on the first voltage code CODE1_R for the first color and the second voltage code CODE2_R for the first color (S140), calculate a ratio R_R of first color luminance to total color luminance in the reference grayscale value RG using the first lookup table (S210), calculate the ratio R_R of the first color luminance to the total color luminance in a correction grayscale value CG using the first lookup table (S220), and generate the first color grayscale correction value GCV_R based on the ratio R_R of the first color luminance in the reference grayscale value RG and the ratio R_R of the first color luminance in the correction grayscale value CG (S230), and perform the gamma correction using the first color position correction value LCV_R, the first color grayscale correction value GCV_R, and the first lookup table (S400).

Specifically, the gamma correction method of FIG. 19 may perform the gamma correction using the first color position correction value LCV_R, the first color grayscale correction value GCV_R, and the first lookup table (S400). In an embodiment, the gamma correction method of FIG. 19 may generate a correction voltage code for the first color based on the product of the first voltage code CODE1_R for the first color, the first color position correction value LCV_R, and the first color grayscale correction value GCV_R (e.g., by multiplying the first voltage code CODE1_R for the first color, the first color position correction value LCV_R, and the first color grayscale correction value GCV_R), generate the second lookup table including the correction voltage code for the first color, and perform the gamma correction using the second lookup table.

For example, it is assumed that the first voltage code CODE1_R for the first color of 16 grayscale value is 1252 at the reference measurement point RMP, the first color position correction value LCV_R of 16 grayscale value is 1.04, and the first color grayscale correction value GCV_R of 16 grayscale value is 0.98. In this case, the correction voltage code for the first color of 16 grayscale value may be 1276 ((1252)*(1.04)*(0.98)=about 1276). Accordingly, when the gamma correction is performed based on the second lookup table, the data voltages corresponding to a voltage code of 1276 may be applied to the pixel P for displaying the first color of 16 grayscale value. Accordingly, the display device may effectively prevent the color coordinate shift according to the position in the display panel 100 and the grayscale value.

Since the gamma correction for the second color and the gamma correction for the third color is substantially the same as the gamma correction for the first color, any repetitive explanation will be omitted.

Figure 20:
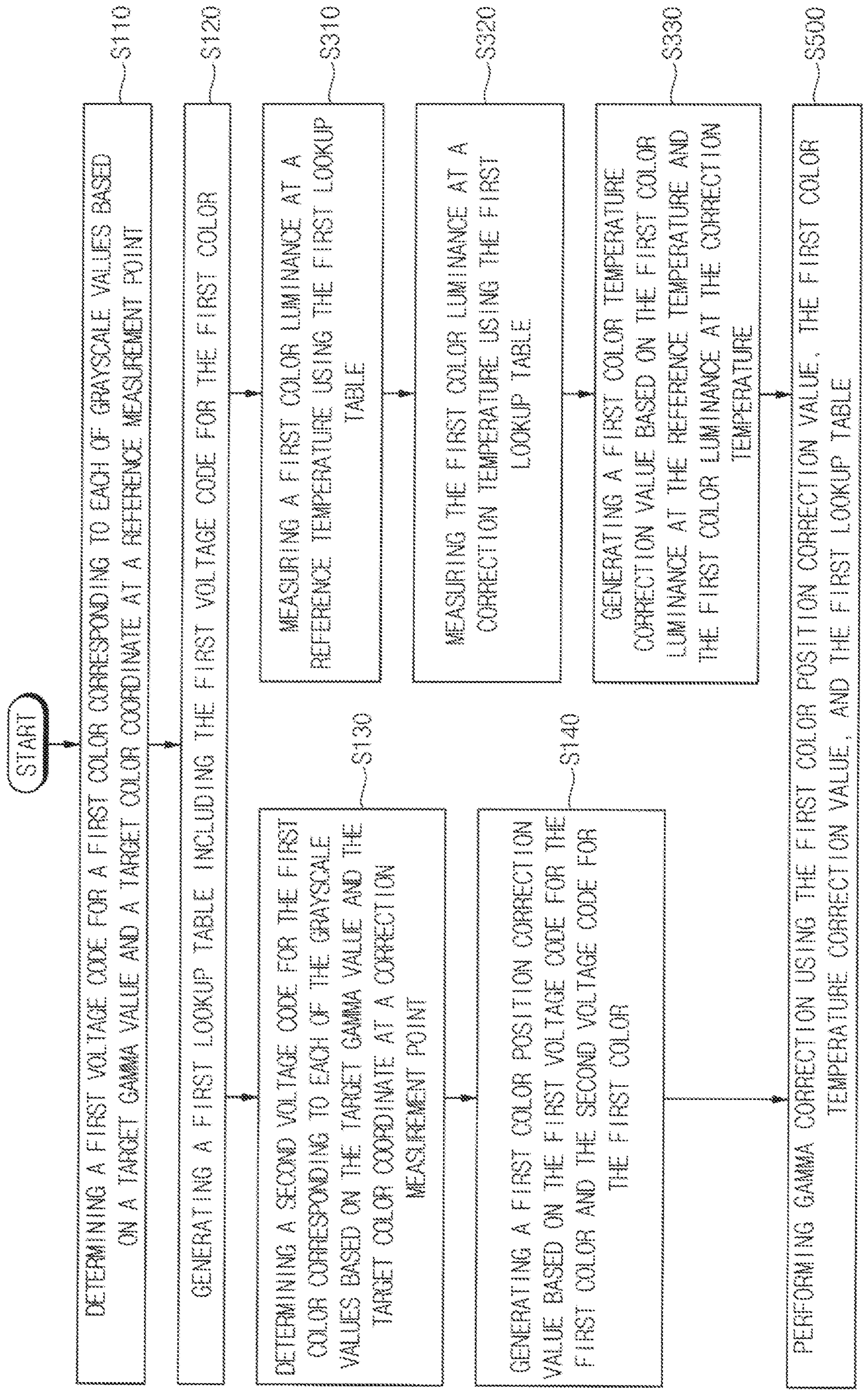
FIG. 20 is a flowchart illustrating a gamma correction method for a display device according to embodiments of the present invention.

FIG. 20 is a flowchart illustrating a gamma correction method for a display device according to embodiments of the present invention.

The gamma correction method according to the present embodiment is substantially the same as the gamma correction method of FIGS. 10 and 16 except for correction values used in the gamma correction. Thus, the same reference numerals are used to refer to the same or similar element, and any repetitive explanation will be omitted.

Referring to FIGS. 1, 12, 13, 15, 17, 18 and 20, the gamma correction method of FIG. 20 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120), determine the second voltage code CODE2_R for the first color corresponding to each of the grayscale values based on the target gamma value and the target color coordinate at the correction measurement point CMP (S130), generate the first color position correction value LCV_R based on the first voltage code CODE1_R for the first color and the second voltage code CODE2_R for the first color (S140), measure the first color luminance L_R at the reference temperature RT using the first lookup table (S310), measure the first color luminance L_R at the correction temperature CT using the first lookup table (S320), generate the first color temperature correction value TCV_R based on the first color luminance L_R at the reference temperature RT and the first color luminance L_R at the correction temperature CT (S330), and perform the gamma correction using the first color position correction value LCV_R, the first color temperature correction value TCV_R, and the first lookup table (S500).

Specifically, the gamma correction method of FIG. 20 may perform the gamma correction using the first color position correction value LCV_R, the first color temperature correction value TCV_R, and the first lookup table (S400). In an embodiment, the gamma correction method of FIG. 19 may generate a correction voltage code for the first color based on the product of the first voltage code CODE1_R for the first color, the first color position correction value LCV_R, and the first color temperature correction value TCV_R (e.g., by multiplying the first voltage code CODE1_R for the first color, the first color position correction value LCV_R, and the first color temperature correction value TCV_R), generate the second lookup table including the correction voltage code for the first color, and perform the gamma correction using the second lookup table.

For example, it is assumed that the first voltage code CODE1_R for the first color of 16 grayscale value is 1252 at the reference measurement point RMP, the first color position correction value LCV_R of 16 grayscale value is 1.04, and the first color temperature correction value TCV_R of 16 grayscale value is 1.13. In this case, the correction voltage code for the first color of 16 grayscale value may be 1471 ((1252)*(1.04)*(1.13)=about 1471). Accordingly, when the gamma correction is performed based on the second lookup table, the data voltages corresponding to a voltage code of 1471 may be applied to the pixel P for displaying the first color of 16 grayscale value. Accordingly, the display device may effectively prevent the color coordinate shift according to the position in the display panel 100 and the temperature.

Since the gamma correction for the second color and the gamma correction for the third color is substantially the same as the gamma correction for the first color, any repetitive explanation will be omitted.

Figure 21:
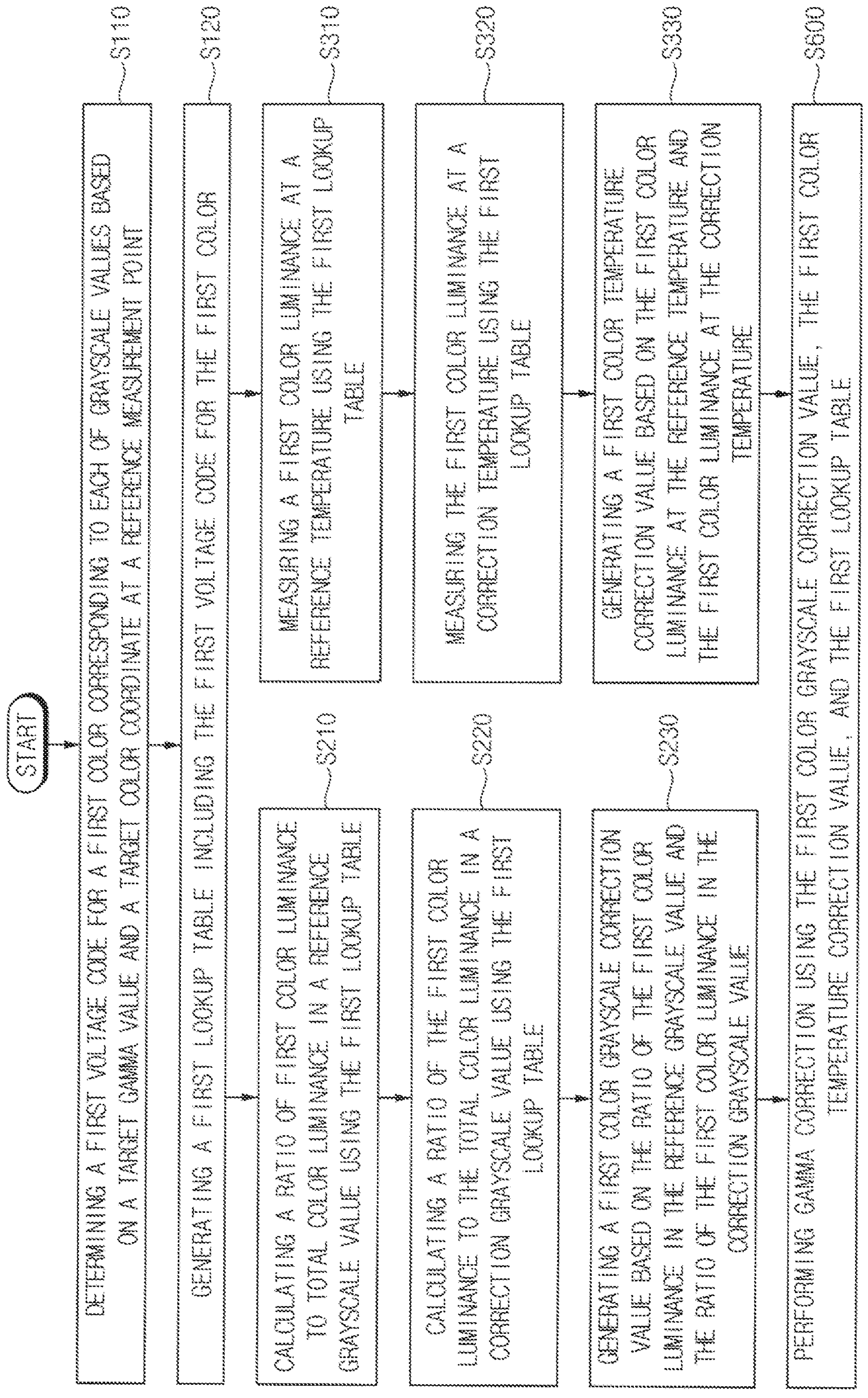
FIG. 21 is a flowchart illustrating a gamma correction method for a display device according to embodiments of the present invention.

FIG. 21 is a flowchart illustrating a gamma correction method for a display device according to embodiments of the present invention.

The gamma correction method according to the present embodiment is substantially the same as the gamma correction method of FIGS. 14 and 16 except for correction values used in the gamma correction. Thus, the same reference numerals are used to refer to the same or similar element, and any repetitive explanation will be omitted.

Referring to FIGS. 1, 12, 15, 17, 18 and 21, the gamma correction method of FIG. 21 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120), calculate a ratio R_R of first color luminance to total color luminance in the reference grayscale value RG using the first lookup table (S210), calculate the ratio R_R of the first color luminance to the total color luminance in a correction grayscale value CG using the first lookup table (S220), and generate the first color grayscale correction value GCV_R based on the ratio R_R of the first color luminance in the reference grayscale value RG and the ratio R_R of the first color luminance in the correction grayscale value CG (S230), measure the first color luminance L_R at the reference temperature RT using the first lookup table (S310), measure the first color luminance L_R at the correction temperature CT using the first lookup table (S320), generate the first color temperature correction value TCV_R based on the first color luminance L_R at the reference temperature RT and the first color luminance L_R at the correction temperature CT (S330), and perform the gamma correction using the first color grayscale correction value GCV_R, the first color temperature correction value TCV_R, and the first lookup table (S600).

Specifically, the gamma correction method of FIG. 21 may perform the gamma correction using the first color grayscale correction value GCV_R, the first color temperature correction value TCV_R, and the first lookup table (S400). In an embodiment, the gamma correction method of FIG. 21 may generate a correction voltage code for the first color based on the product of the first voltage code CODE1_R for the first color, the first color grayscale correction value GCV_R, and the first color temperature correction value TCV_R (e.g., by multiplying the first voltage code CODE1_R for the first color, the first color grayscale correction value GCV_R, and the first color temperature correction value TCV_R), generate the second lookup table including the correction voltage code for the first color, and perform the gamma correction using the second lookup table.

For example, it is assumed that the first voltage code CODE1_R for the first color of 16 grayscale value is 1252 at the reference measurement point RMP, the first color grayscale correction value GCV_R of 16 grayscale value is 0.98, and the first color temperature correction value TCV_R of 16 grayscale value is 1.13. In this case, the correction voltage code for the first color of 16 grayscale value may be 1386 ((1252)*(0.98)*(1.13)=about 1386). Accordingly, when the gamma correction is performed based on the second lookup table, the data voltages corresponding to a voltage code of 1386 may be applied to the pixel P for displaying the first color of 16 grayscale value. Accordingly, the display device may effectively prevent the color coordinate shift according to the grayscale value and the temperature.

Since the gamma correction for the second color and the gamma correction for the third color is substantially the same as the gamma correction for the first color, any repetitive explanation will be omitted.

Figure 22:
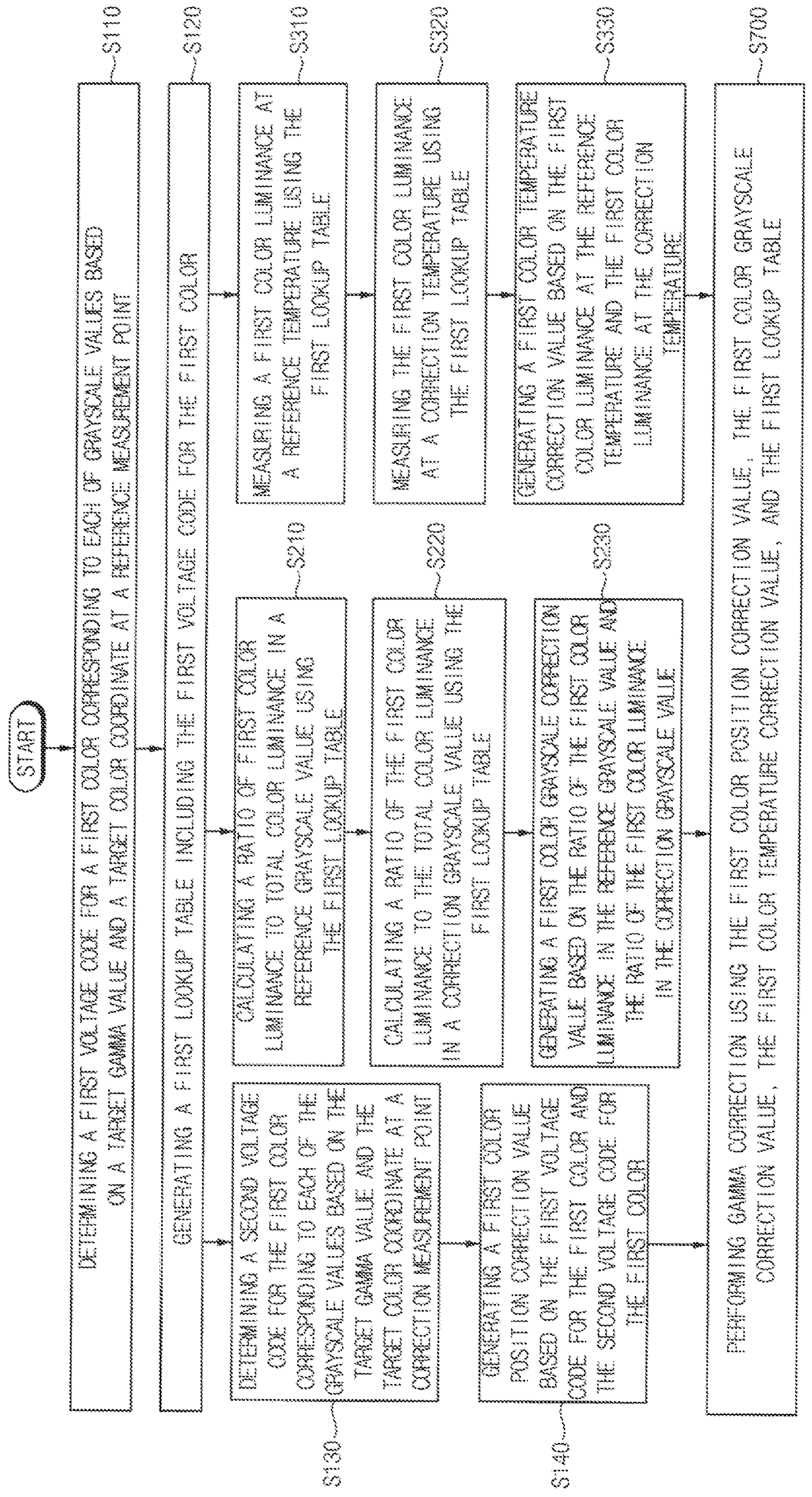
FIG. 22 is a flowchart illustrating a gamma correction method for a display device according to embodiments of the present invention.

FIG. 22 is a flowchart illustrating a gamma correction method for a display device according to embodiments of the present invention.

The gamma correction method according to the present embodiment is substantially the same as the gamma correction method of FIGS. 10 and 16 except for correction values used in the gamma correction. Thus, the same reference numerals are used to refer to the same or similar element, and any repetitive explanation will be omitted.

Referring to FIGS. 1, 12, 13, 15, 17, 18 and 20, the gamma correction method of FIG. 20 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120), determine the second voltage code CODE2_R for the first color corresponding to each of the grayscale values based on the target gamma value and the target color coordinate at the correction measurement point CMP (S130), generate the first color position correction value LCV_R based on the first voltage code CODE1_R for the first color and the second voltage code CODE2_R for the first color (S140), measure the first color luminance L_R at the reference temperature RT using the first lookup table (S310), measure the first color luminance L_R at the correction temperature CT using the first lookup table (S320), generate the first color temperature correction value TCV_R based on the first color luminance L_R at the reference temperature RT and the first color luminance L_R at the correction temperature CT (S330), and perform the gamma correction using the first color position correction value LCV_R, the first color temperature correction value TCV_R, and the first lookup table (S500).

Specifically, the gamma correction method of FIG. 20 may perform the gamma correction using the first color position correction value LCV_R, the first color temperature correction value TCV_R, and the first lookup table (S400). In an embodiment, the gamma correction method of FIG. 19 may generate a correction voltage code for the first color based on the product of the first voltage code CODE1_R for the first color, the first color position correction value LCV_R, and the first color temperature correction value TCV_R (e.g., by multiplying the first voltage code CODE1_R for the first color, the first color position correction value LCV_R, and the first color temperature correction value TCV_R), generate the second lookup table including the correction voltage code for the first color, and perform the gamma correction using the second lookup table.

For example, it is assumed that the first voltage code CODE1_R for the first color of 16 grayscale value is 1252 at the reference measurement point RMP, the first color position correction value LCV_R of 16 grayscale value is 1.04, and the first color temperature correction value TCV_R of 16 grayscale value is 1.13. In this case, the correction voltage code for the first color of 16 grayscale value may be 1471 ((1252)*(1.04)*(1.13)=about 1471). Accordingly, when the gamma correction is performed based on the second lookup table, the data voltages corresponding to a voltage code of 1471 may be applied to the pixel P for displaying the first color of 16 grayscale value. Accordingly, the display device may effectively prevent the color coordinate shift according to the position in the display panel 100 and the temperature.

Since the gamma correction for the second color and the gamma correction for the third color is substantially the same as the gamma correction for the first color, any repetitive explanation will be omitted.

FIG. 21 is a flowchart illustrating a gamma correction method for a display device according to embodiments of the present invention.

The gamma correction method according to the present embodiment is substantially the same as the gamma correction method of FIGS. 10, 14 and 16 except for correction values used in the gamma correction. Thus, the same reference numerals are used to refer to the same or similar element, and any repetitive explanation will be omitted.

Referring to FIGS. 1, 12, 15, 17, 18 and 22, the gamma correction method of FIG. 21 may determine the first voltage code CODE1_R for the first color corresponding to each of the grayscale values based on the target gamma value and the target color coordinate at the reference measurement point RMP (S110), and generate the first lookup table including the first voltage code CODE1_R for the first color (S120), determine the second voltage code CODE2_R for the first color corresponding to each of the grayscale values based on the target gamma value and the target color coordinate at the correction measurement point CMP (S130), generate the first color position correction value LCV_R based on the first voltage code CODE1_R for the first color and the second voltage code CODE2_R for the first color (S140), calculate a ratio R_R of first color luminance to total color luminance in the reference grayscale value RG using the first lookup table (S210), calculate the ratio R_R of the first color luminance to the total color luminance in a correction grayscale value CG using the first lookup table (S220), and generate the first color grayscale correction value GCV_R based on the ratio R_R of the first color luminance in the reference grayscale value RG and the ratio R_R of the first color luminance in the correction grayscale value CG (S230), measure the first color luminance L_R at the reference temperature RT using the first lookup table (S310), measure the first color luminance L_R at the correction temperature CT using the first lookup table (S320), generate the first color temperature correction value TCV_R based on the first color luminance L_R at the reference temperature RT and the first color luminance L_R at the correction temperature CT (S330), and perform the gamma correction using the first color position correction value LCV_R, the first color grayscale correction value GCV_R, the first color temperature correction value TCV_R, and the first lookup table (S700).

Specifically, the gamma correction method of FIG. 22 may perform the gamma correction using the first color position correction value, the first color grayscale correction value GCV_R, the first color temperature correction value TCV_R, and the first lookup table (S400). In an embodiment, the gamma correction method of FIG. 22 may generate a correction voltage code for the first color based on the product of the first voltage code CODE1_R for the first color, the first color position correction value LCV_R, the first color grayscale correction value GCV_R, and the first color temperature correction value TCV_R (e.g., by multiplying the first voltage code CODE1_R for the first color, the first color position correction value LCV_R, the first color grayscale correction value GCV_R, and the first color temperature correction value TCV_R), generate the second lookup table including the correction voltage code for the first color, and perform the gamma correction using the second lookup table.

For example, it is assumed that the first voltage code CODE1_R for the first color of 16 grayscale value is 1252 at the reference measurement point RMP, the first color position correction value LCV_R of 16 grayscale value is 1.04, the first color grayscale correction value GCV_R of 16 grayscale value is 0.98, and the first color temperature correction value TCV_R of 16 grayscale value is 1.13. In this case, the correction voltage code for the first color of 16 grayscale value may be 1442 ((1252)*(1.04)*(0.98)*(1.13) =about 1442). Accordingly, when the gamma correction is performed based on the second lookup table, the data voltages corresponding to a voltage code of 1442 may be applied to the pixel P for displaying the first color of 16 grayscale value. Accordingly, the display device may effectively prevent the color coordinate shift according to the position in the display panel 100, the grayscale value, and the temperature.

Since the gamma correction for the second color and the gamma correction for the third color is substantially the same as the gamma correction for the first color, any repetitive explanation will be omitted.

Figure 23:
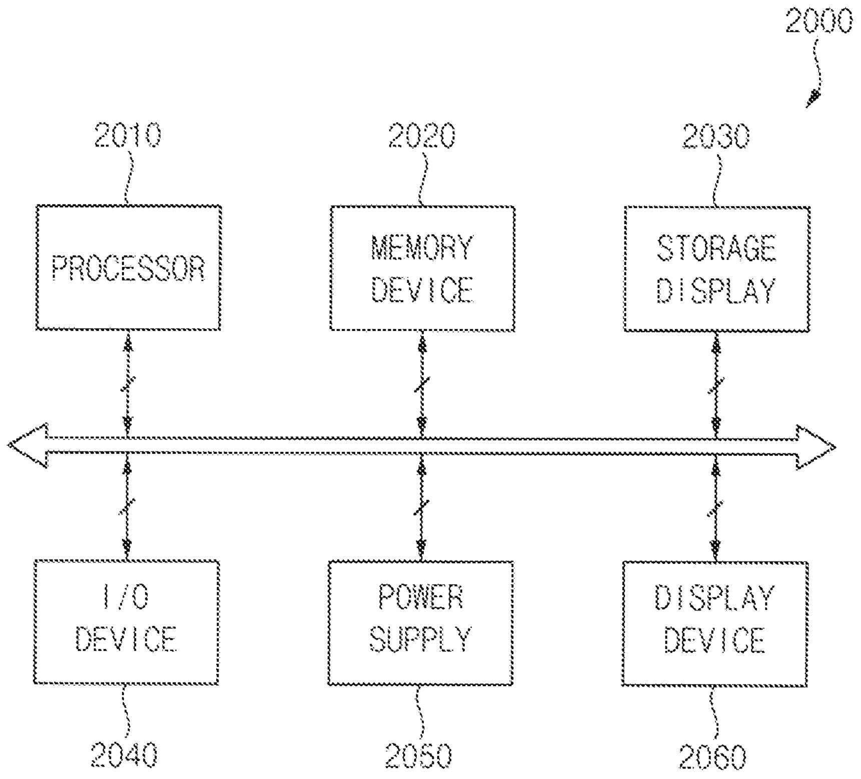
FIG. 23 is a block diagram showing an electronic device according to embodiments of the present invention.
Figure 24:
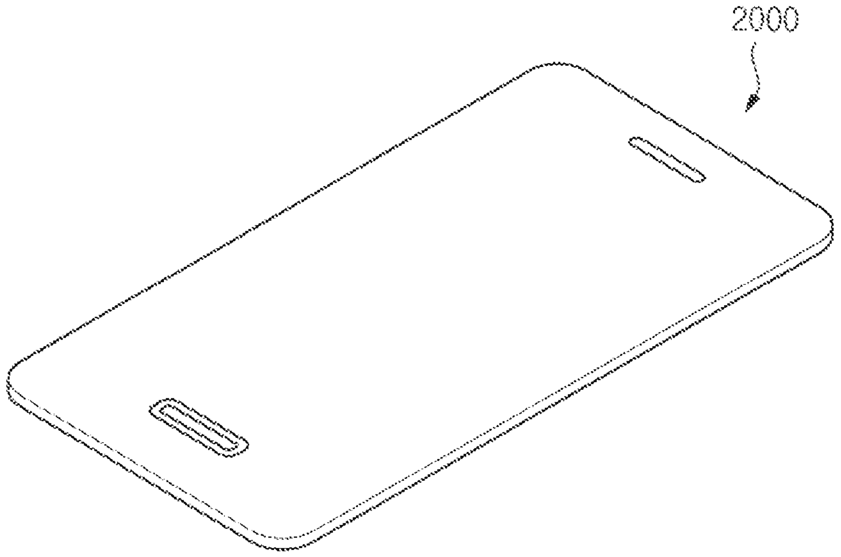
FIG. 24 is a diagram showing an example in which the electronic device of FIG. 23 is implemented as a smart phone.

FIG. 23 is a block diagram showing an electronic device according to embodiments of the present invention, and FIG. 24 is a diagram showing an example in which the electronic device of FIG. 23 is implemented as a smart phone.

Referring to FIGS. 11 and 12, the electronic device 2000 may include a processor 2010, a memory device 2020, a storage device 2030, an input/output ("I/O") device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus ("USB") device, other electronic devices, etc. In an embodiment, as shown in FIG. 24, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display ("HMD") device, etc.

The processor 2010 may perform various computing functions. The processor 2010 may be a micro-processor, a central processing unit ("CPU"), an application processor ("AP"), etc. The processor 2010 may be coupled to other components via an address bus, a control bus, a data bus, etc. Further, the processor 2010 may be coupled to an extended bus such as a peripheral component interconnection ("PCI") bus.

The memory device 2020 may store data for operations of the electronic device 2000. For example, the memory device 2020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc.

The storage device 2030 may include a solid state drive ("SSD") device, a hard disk drive ("HDD") device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit ("PMIC").

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may effectively prevent the color shift according to the position, the grayscale value, and/or the temperature by using the second lookup table generated using a position correction value, a grayscale correction value, and/or a temperature correction value.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A gamma correction method for a display device comprising:

determining a first voltage code for a first color corresponding to each of grayscale values based on a target gamma value and a target color coordinate at a reference measurement point;

generating a first lookup table including the first voltage code for the first color;

determining a second voltage code for the first color corresponding to each of the grayscale values based on the target gamma value and the target color coordinate at a correction measurement point;

generating a first color position correction value based on the first voltage code for the first color and the second voltage code for the first color; and performing gamma correction using the first color position correction value and the first lookup table, wherein the display device includes a plurality of measurement points arranged in a two-dimensional array, the plurality of measurement points include the reference measurement point and the correction measurement point, wherein the reference measurement point has a physical location in the display device that is different than the correction measurement point and the physical location of the reference measurement point is located at a geometric center of the two-dimensional array of measurement points, wherein the first voltage code for the first color is determined based on the target gamma value and the target color coordinate at the reference measurement point, and the second voltage code for the first color is determined based on the target gamma value and the target color coordinate at the correction measurement point, wherein the first color position correction value is determined by dividing the second voltage code for the first color by the first voltage code for the first color for a same grayscale value, and wherein the gamma correction is performed using the first color position correction value to correct for a color coordinate shift according to the position in the display device.

2. The gamma correction method of claim 1, further comprising:

calculating a ratio of first color luminance to total color luminance in a reference grayscale value using the first lookup table;

calculating a ratio of the first color luminance to the total color luminance in a correction grayscale value using the first lookup table; and generating a first color grayscale correction value based on the ratio of the first color luminance in the reference grayscale value and the ratio of the first color luminance in the correction grayscale value, wherein the gamma correction is performed using the first color grayscale correction value.

3. The gamma correction method of claim 2, wherein the reference grayscale value is a maximum grayscale value.

4. The gamma correction method of claim 2, wherein the first color grayscale correction value is determined by dividing the ratio of the first color luminance in the correction grayscale value by the ratio of the first color luminance in the reference grayscale value.

5. The gamma correction method of claim 2, wherein performing the gamma correction comprises:

generating a correction voltage code for the first color based on product of the first voltage code for the first color, the first color position correction value, and the first color grayscale correction value;

generating a second lookup table including the correction voltage code for the first color; and performing the gamma correction using the second lookup table.

6. The gamma correction method of claim 1, further comprising:

measuring a first color luminance at a reference temperature using the first lookup table;

measuring the first color luminance at a correction temperature using the first lookup table; and generating a first color temperature correction value based on the first color luminance at the reference temperature and the first color luminance at the correction temperature, wherein the gamma correction is performed using the first color temperature correction value.

7. The gamma correction method of claim 6, wherein the first color luminance is measured at the reference measurement point.

8. The gamma correction method of claim 6, wherein the first color temperature correction value is determined by dividing the first color luminance at the reference temperature by the first color luminance at the correction temperature.

9. The gamma correction method of claim 6, wherein performing the gamma correction comprises:

generating a correction voltage code for the first color based on product of the first voltage code for the first color, the first color position correction value, and the first color temperature correction value;

generating a second lookup table including the correction voltage code for the first color; and performing the gamma correction using the second lookup table.

10. The gamma correction method of claim 1, further comprising:

determining a first voltage code for a second color and a first voltage code for a third color corresponding to each of the grayscale values based on the target gamma value and the target color coordinate at the reference measurement point;

determining a second voltage code for the second color and a second voltage code for the third color corresponding to each of the grayscale values based on the target gamma value and the target color coordinate at the correction measurement point;

generating a second color position correction value based on the first voltage code for the second color and the second voltage code for the second color; and generating a third color position correction value based on the first voltage code for the third color and the second voltage code for the third color, wherein the first lookup table further includes the first voltage code for the second color and the first voltage code for the third color, and wherein the gamma correction is performed further using the second color position correction value and the third color position correction value.

* * * * *